(12) United States Patent
Poulos et al.

(10) Patent No.: US 10,254,546 B2
(45) Date of Patent: Apr. 9, 2019

(54) OPTICALLY AUGMENTING ELECTROMAGNETIC TRACKING IN MIXED REALITY

(71) Applicant: Microsoft Technology Licensing, LLC, Redmond, WA (US)

(72) Inventors: Adam G. Poulos, Sammamish, WA (US); Arthur Tomlin, Kirkland, WA (US); Alexandru Octavian Balan, Sammamish, WA (US); Constantin Dulu, Redmond, WA (US); Christopher Douglas Edmonds, Carnation, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 361 days.

(21) Appl. No.: 15/174,920

(22) Filed: Jun. 6, 2016

(65) Prior Publication Data

US 2017/0351094 A1    Dec. 7, 2017

(51) Int. Cl.
*G01C 9/00*        (2006.01)
*G02B 27/01*     (2006.01)
(Continued)

(52) U.S. Cl.
CPC ......... *G02B 27/0172* (2013.01); *G01B 7/003* (2013.01); *G01B 11/022* (2013.01);
(Continued)

(58) Field of Classification Search
None
See application file for complete search history.

(56) References Cited

U.S. PATENT DOCUMENTS

| 5,592,401 A | 1/1997 | Kramer |
| 7,113,618 B2 | 9/2006 | Junkins et al. |

(Continued)

FOREIGN PATENT DOCUMENTS

| EP | 1521482 A2 | 4/2005 |
| WO | 2015123771 A1 | 8/2015 |

(Continued)

OTHER PUBLICATIONS

Auer, T. et al., "Building a Hybrid Tracking System: Integration of Optical and Magnetic Tracking," In Proceedings of the 2nd IEEE and ACM International Workshop on Augmented Reality (IWAR '99), Oct. 20, 1999, San Francisco, CA, USA, 10 pages.

(Continued)

*Primary Examiner* — Aditya Bhat
(74) *Attorney, Agent, or Firm* — Alleman Hall Creasman & Tuttle LLP

(57) ABSTRACT

A mixed reality system may comprise a head-mounted display (HMD) device with a location sensor and a base station, mounted a predetermined offset from the location sensor, that emits an electromagnetic field (EMF). An EMF sensor affixed to an object may sense the EMF, forming a magnetic tracking system. The HMD device may determine a relative location of the EMF sensor therefrom and determine a location of the EMF sensor in space based on the relative location, the predetermined offset, and the location of the location sensor. An optical tracking system comprising a marker an optical sensor configured to capture optical data may be included to augment the magnetic tracking system based on the optical data and a location of the optical sensor or marker. The HMD device may display augmented reality images and overlay a hologram corresponding to the location of the EMF sensor over time.

18 Claims, 16 Drawing Sheets

(51) Int. Cl.
| | |
|---|---|
| *G01B 7/00* | (2006.01) |
| *G01B 11/02* | (2006.01) |
| *G06T 19/00* | (2011.01) |
| *G06F 3/01* | (2006.01) |
| *G06F 3/03* | (2006.01) |

(52) U.S. Cl.
CPC ............ *G02B 27/017* (2013.01); *G06F 3/011* (2013.01); *G06F 3/017* (2013.01); *G06F 3/0304* (2013.01); *G06T 19/006* (2013.01); *G02B 2027/0192* (2013.01)

(56) References Cited

U.S. PATENT DOCUMENTS

| | | | |
|---|---|---|---|
| 7,920,165 | B2 | 4/2011 | Adderton |
| 8,393,964 | B2 | 3/2013 | Huang et al. |
| 8,442,502 | B2 | 5/2013 | Leung |
| 8,610,771 | B2 | 12/2013 | Leung et al. |
| 9,030,495 | B2 | 5/2015 | McCulloch et al. |
| 9,141,194 | B1 | 9/2015 | Keyes et al. |
| 9,229,540 | B2 | 1/2016 | Mandella et al. |
| 9,235,934 | B2 | 1/2016 | Mandella et al. |
| 9,354,445 | B1 * | 5/2016 | Weaver .............. G02B 27/0093 |
| 2006/0176242 | A1 | 8/2006 | Jaramaz et al. |
| 2006/0256110 | A1 | 11/2006 | Okuno et al. |
| 2009/0033588 | A1 | 2/2009 | Kajita et al. |
| 2012/0249807 | A1 | 10/2012 | Sugden |
| 2014/0287806 | A1 | 9/2014 | Balachandreswaran |
| 2015/0097719 | A1 | 4/2015 | Balachandreswaran et al. |
| 2015/0177831 | A1 | 6/2015 | Chan et al. |
| 2015/0187326 | A1 | 7/2015 | Doyen et al. |
| 2015/0221135 | A1 | 8/2015 | Hill et al. |
| 2015/0317831 | A1 | 11/2015 | Ebstyne et al. |
| 2015/0317833 | A1 | 11/2015 | Ebstyne et al. |
| 2015/0371083 | A1 | 12/2015 | Csaszar et al. |
| 2016/0005233 | A1 | 1/2016 | Fraccaroli et al. |
| 2016/0005234 | A1 | 1/2016 | Boivin et al. |
| 2016/0033768 | A1 | 2/2016 | Pedrotti et al. |
| 2016/0041391 | A1 | 2/2016 | Van Curen et al. |
| 2016/0093105 | A1 | 3/2016 | Rimon et al. |
| 2016/0259404 | A1 | 9/2016 | Woods |
| 2017/0307891 | A1 | 10/2017 | Bucknor et al. |

FOREIGN PATENT DOCUMENTS

| | | | |
|---|---|---|---|
| WO | 2016041088 | A1 | 3/2016 |
| WO | WO2016041088 | * | 3/2016 |

OTHER PUBLICATIONS

ISA European Patent Office, International Search Report and Written Opinion Issued in PCT Application No. PCT/US2017/024392, dated Jun. 23, 2017, WIPO, 13 pages.
ISA European Patent Office, International Search Report and Written Opinion Issued in PCT Application No. PCT/US2017/034901, dated Jul. 13, 2017, WIPO, 14 pages.
ISA European Patent Office, International Search Report and Written Opinion Issued in PCT Application No. PCT/US2017/034362, dated Aug. 9, 2017, WIPO, 29 pages.
"Non-Final Office Action Issued in U.S. Appl. No. 15/174,937", dated Nov. 16, 2017, 37 Pages.
"Final Office Action Issued in U.S. Appl. No. 15/087,833", dated Apr. 2, 2018, 22 Pages.
"Non Final Office Action Issued in U.S. Appl. No. 15/087,833", dated Aug. 18, 2017, 22 Pages.
Schwald, et al., "Composing 6 DOF Tracking Systems for VR/AR", In Proceedings of Computer Graphics International, Jun. 19, 2014, 8 pages.
Gaspar, et al., "Accurate Infrared Tracking System for Immersive Virtual Environments", In International Journal of Creative Interfaces and Computer Graphics, vol. 2, Issue 2, Jul. 2011, 26 pages.
Coulson, Simon, "Real Time Positioning and Motion Tracking for Simulated Clay Pigeon Shooting Environments", In Master Thesis of Imperial College of London, Retrieved on: Mar. 14, 2016, 84 pages.
"Tracking Interfaces", Retrieved on: Mar. 14, 2016, Available at: ftp://www.hitl.washington.edu/pub/scivw/publications/IDA-pdf/TRACK.PDF.
Smith, et al., "Real-Time 3D Hand tracking in a Virtual Environment", In Proceedings of SPIE, vol. 5006, May 29, 2003, 15 pages.
Thomas, J. et al., "MuVR: A Multi-user Virtual Reality Platform," Proceedings of IEEE Virtual Reality, Mar. 29, 2014, Minneapolis, Minnesota, 2 pages.
Varga, M. et al., "Augmented Reality with Interactive Interfaces," Studia Universitatis Babes-Bolyai, Informatica, vol. 59, No. 2, Jul. 2014, 13 pages.
James, P., "10 Things You Didn't Know About Steam VR's Lighthouse Tracking System," Road to VR Website, Available Online at www.roadtovr.com/10-things-you-didnt-know-about-steam-vrs-lighthouse-tracking-system/, Mar. 6, 2015, 2 pages.
Yang, J., "FOVE: New Industrial Design & Base Station + Controller & Samsung Ventured Backed," Virtual Reality Reporter Website, Available Online at https://virtualrealityreporter.com/fove-vr-hmd-new-design-base-station-controller-samsung-venture-eye-tracking/, Available as Early as Jul. 11, 2015, Retrieved Dec. 22, 2015, 6 pages.
"Virtual Reality Shopping Is on Its Way with Sixense," Vice Motherboard Website, Available Online at http://motherboard.vice.com/blog/virtual-reality-shopping-is-on-its-way-with-sixense, Sep. 28, 2015, 9 pages.
"The Sixense STEM," Virtual Reality Society Website, Available Online at www.vrs.org.uk/virtual-reality-gear/motion-tracking/stem.html, Available as Early as Nov. 15, 2015, Retrieved May 19, 2016, 2 pages.
"HTC Vive," HTC Vive Website, Available Online at www.htcvive.com/us/, Available as Early as Dec. 17, 2015, 6 pages.
Blain, A., "Comparison of Virtual Reality Head Mounted Displays," Amanda Blain Website, Available Online at www.amandablain.com/into-virtual-reality-head-mounted-displays/, Mar. 30, 2016, Retrieved May 20, 2016, 12 pages.
Poulos, Adam G. et al., "Electromagnetic Tracking of Objects for Mixed Reality," U.S. Appl. No. 15/087,833, filed Mar. 31, 2016, 39 pages.
Poulos, Adam G. et al., "Optically Augmenting Electromagnetic Tracking in Mixed Reality," U.S. Appl. No. 15/174,937, filed Jun. 6, 2016, 72 pages.
"Final Office Action Issued in U.S. Appl. No. 15/174,937", dated May 31, 2018, 33 Pages.

* cited by examiner

OPTICALLY AUGMENTING ELECTROMAGNETIC TRACKING IN MIXED REALITY

BACKGROUND

Recently, various technologies have emerged that allow users to experience a blend of reality and virtual worlds along a mixed reality continuum. For example, head-mounted display (HMD) devices may include various sensors that allow the HMD device to display a blend of reality and virtual objects on the HMD device as augmented reality, or block out the real world view to display only virtual reality. Whether for virtual or augmented reality, a closer tie between real-world features and the display of virtual objects is often desired in order to heighten the interactive experience and provide the user with more control.

One way to bring real-world features into the virtual world is to track a handheld controller through space as it is being used. However, some conventional controllers lack precise resolution and users end up with choppy, inaccurate display of the virtual objects. Some handheld controllers even require externally positioned cameras, tethering use of the HMD device to a small area. Similarly, some physical object tracking systems use stationary transmitters with a short transmission range, also tethering the user to a small area. Further, these physical object tracking systems often experience signal degradation toward the limits of the transmission range in addition to interference from other objects and energy sources in the environment. In the face of such degradation, the accuracy of the tracking system can become completely unreliable under various circumstances, which negatively impacts the interactive experience for the user. Further still, they often report position within one zone at a time, which can lead to problems when the object is moved between zones while temporarily located beyond the range of the tracking system.

SUMMARY

A mixed reality system may comprise a head-mounted display (HMD) device with a location sensor from which the HMD device determines a location of the location sensor in space and a base station mounted at a fixed position relative to the HMD device a predetermined offset from the location sensor and configured to emit an electromagnetic field (EMF). The system may further comprise an EMF sensor affixed to an object and configured to sense a strength of the EMF, the base station and EMF sensor together forming a magnetic tracking system. The HMD device may determine a location of the EMF sensor relative to the base station based on the sensed strength and determine location of the EMF sensor in space based on the relative location, the predetermined offset, and the location of the location sensor in space.

The mixed reality system may further comprise an optical tracking system comprising at least one marker and at least one optical sensor configured to capture optical data, and the processor may be further configured to augment the magnetic tracking system based on the optical data and a location of the camera or marker. In some aspects, the object may be a handheld input device configured to provide user input to the HMD device.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
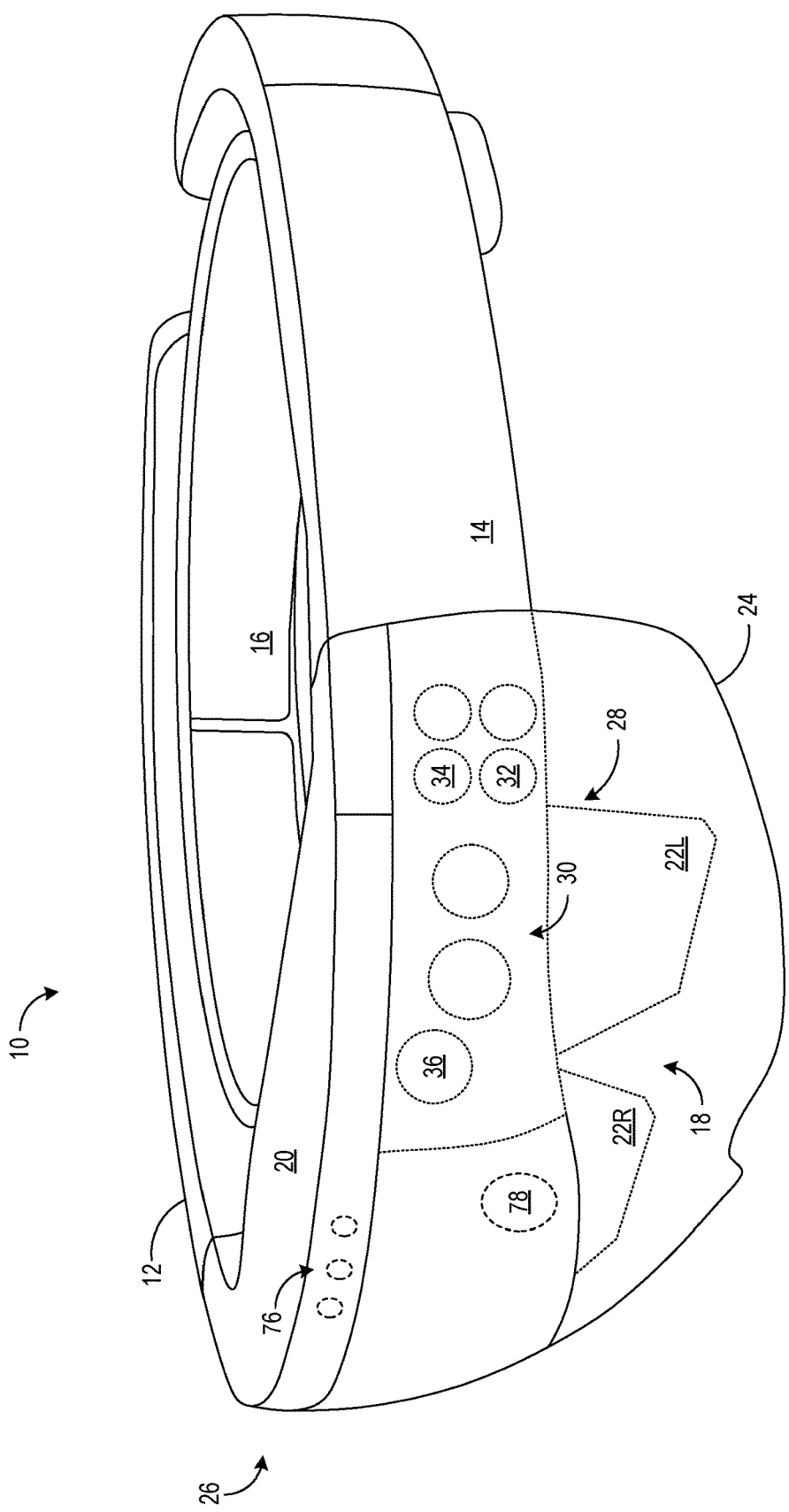
FIG. 1 shows a schematic illustration of a head-mounted display (HMD) device.

FIG. 1 shows a schematic illustration of a head-mounted display (HMD) device 10, which may be part of a mixed reality system 100 (described later). The illustrated HMD device 10 takes the form of a wearable visor, but it will be appreciated that other forms are possible, such as glasses or goggles, among others. The HMD device 10 may include a housing 12 including a band 14 and an inner band 16 to rest on a user's head. The HMD device 10 may include a display 18 which is controlled by a controller 20. The display 18 may be a stereoscopic display and may include a left panel 22L and a right panel 22R as shown, or alternatively, a single panel of a suitable shape. The panels 22L, 22R are not limited to the shape shown and may be, for example, round, oval, square, or other shapes including lens-shaped. The HMD device 10 may also include a shield 24 attached to a front portion 26 of the housing 12 of the HMD device 10. The display 18 and/or the shield 24 may include one or more regions that are transparent, opaque, or semi-transparent. Any of these portions may further be configured to change transparency by suitable means. As such, the HMD device 10 may be suited for both augmented reality situations anal virtual reality situations.

The head-mounted display (HMD) device 10 may comprise a position sensor system 28 which may include one or more sensors such as optical sensor(s) like depth camera(s) and RGB camera(s), accelerometer(s), gyroscope(s), magnetometer(s), global position system(s) (GPSs), multilateration tracker(s), and/or other sensors that output position sensor information usable to extract a position, e.g., (X, Y, Z), orientation, e.g., (pitch, roll, yaw), and/or movement of the relevant sensor. Of these, the position sensor system 28 may include one or more location sensor 30 from which the HMD device 10 determines a location 62 (see FIG. 2) of the location sensor 30 in space. As used herein, a "location" may be a "pose" and may include position and orientation for a total of six values per location. For example, the location sensor 30 may be at least one camera, and as depicted, may be a camera cluster. The position sensor system 28 is also shown as including at least an accelerometer 32 and gyroscope 34. In another example, the HMD device 10 may determine the location of the location sensor 30 by receiving a calculated location from an externally positioned locating system that calculates the location of the HMD device 10 as the location of the location sensor 30.

The HMD device 10 may include a base station 36 mounted at a fixed position relative to the HMD device 10 a predetermined offset 60 (see FIG. 2) from the location sensor 30. In the depicted example, the base station 36 may be positioned in the front portion 26 of the housing 12 of the HMD device 10 where the base station 36 is rigidly supported and unlikely to move relative to the HMD device 10. The base station 36 may be configured to emit an electromagnetic field 38, discussed below with reference to FIG. 2.

Figure 2:
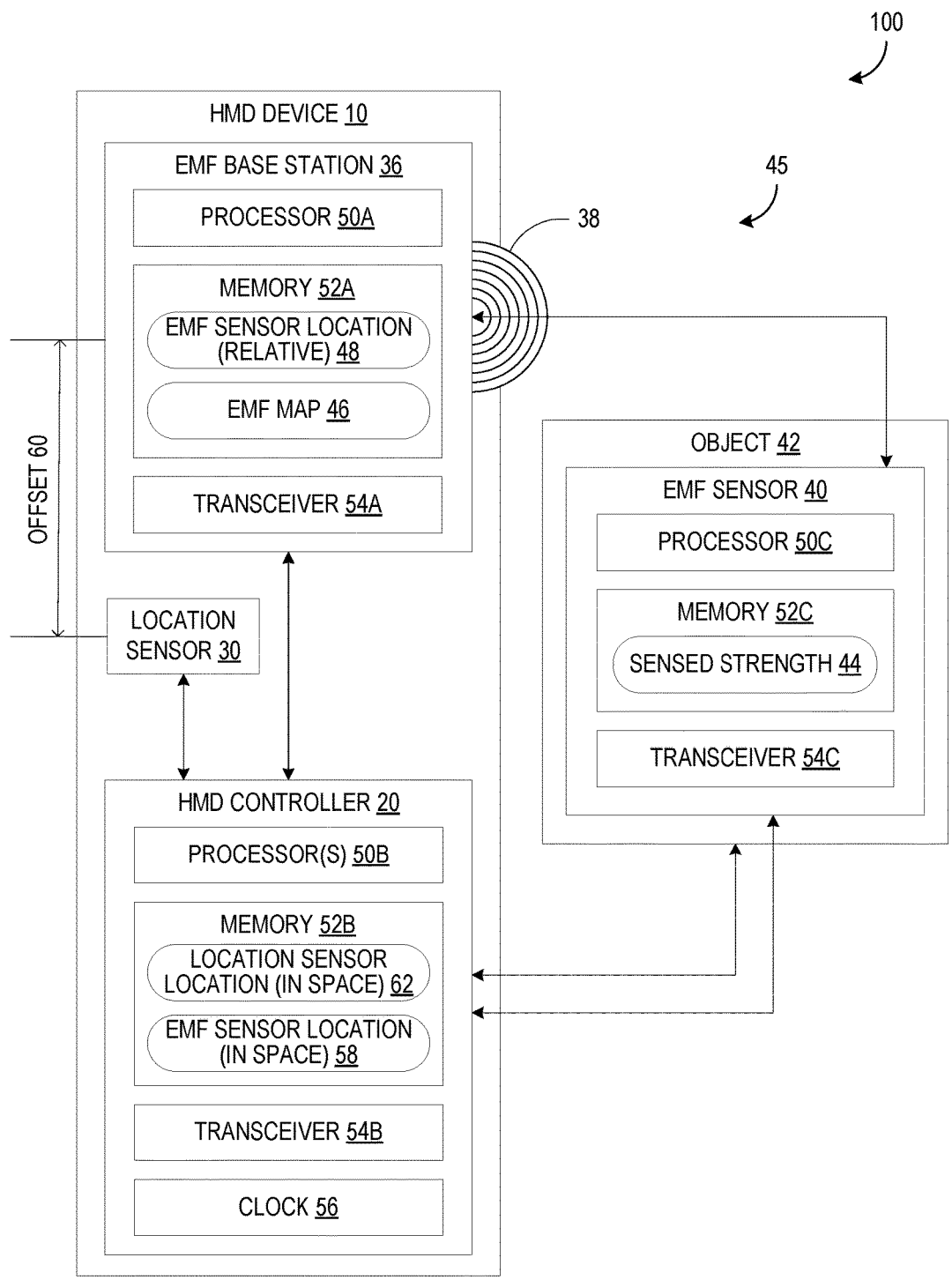
FIG. 2 shows an example software-hardware diagram of a mixed reality system including the HMD device.

FIG. 2 shows an example software-hardware diagram of the mixed reality system 100 including the HMD device 10. In addition to the HMD device 10, the mixed reality system 100 may also include an electromagnetic field sensor 40 affixed to an object 42 and configured to sense a strength 44 of the electromagnetic field 38. The electromagnetic field sensor 40 may be incorporated into the object 42 or may be in the form of a removably mountable sensor which may be temporarily affixed to the object 42 via adhesives, fasteners, etc., such that the object 42 being tracked may be swapped out and may thus be a wide variety of objects. The base station 36 and the electromagnetic field sensor 40 together may form a magnetic tracking system 45. It will be appreciated that each of the base station 36 and the electromagnetic field sensor 40 may include three orthogonal coils that experience a respective magnetic flux.

The electromagnetic field 38 may propagate in all directions, and may be blocked or otherwise affected by various materials, such as metals, or energy sources, etc. When the base station 36 is rigidly supported at a fixed location relative to the HMD device 10, components of the HMD device 10 which are known to cause interference may be accounted for by generating an electromagnetic field map 46 of various sensed strengths 44, each measured at a known relative location 48. Furthermore, when the base station 36 is positioned in the front portion 26 of the housing 12, fewer sources of interference may be present between the base station 36 and the electromagnetic field sensor 40, and when the user of the HMD device 10 is holding or looking at the object 42, then the range of the base station 36 may be utilized to its full potential by positioning the base station 36 in front of the user at all times.

The base station 36 may include a processor 50A configured to execute instructions stored in memory 52A and a transceiver 54A that allows the base station to communicate with the electromagnetic field sensor 40 and/or controller 20. The base station 36 may also be configured to communicate over a wired connection, which may decrease latency in the mixed reality system 100. The controller 20 may include one or more processors 50B configured to execute instructions stored in memory 52B and a transceiver 54B that allows the controller to communicate with the electromagnetic field sensor 40, the base station 36, and/or other devices. Further, the electromagnetic field sensor 40 may include a processor 50C configured to execute instructions stored in memory 52C and a transceiver 54C that allows the electromagnetic field sensor 40 to wirelessly communicate with the base station 36 and/or controller 20. Wireless communication may occur over, for example, WI-FI, BLUETOOTH, or a custom wireless protocol. It will be appreciated that a transceiver may comprise one or more combined or separate receiver and transmitter.

The electromagnetic field map 46 which correlates the known pattern of the electromagnetic field 38 emitted by the base station 36 to the sensed strength 44 at various relative locations within the range of the base station 36 may be stored in the memory 52A, 52B, and/or 52C. In order to synchronize measurements performed by the pair of the electromagnetic field sensor 40 and the base station 36 with measurements performed by the location sensor 30, the controller 20 may include a common clock 56 to provide timestamps for data reporting from multiple sources.

The HMD device 10 may include a processor, which may be the processor 50A or the processor 50B, configured to determine a location 48 of the electromagnetic field sensor 40 relative to the base station 36 based on the sensed strength 44. The processor may be configured to determine a location 58 of the electromagnetic field sensor 40 in space based on the relative location 48, the predetermined offset 60, and the location 62 of the location sensor 30 in space. If the location sensor is a camera, for example, the camera may be configured to send the controller 20 one or more images from which the controller may, via image recognition, determine the location of the location sensor 30 in space. If the location sensor is a GPS receiver paired with an accelerometer, as another example, then the location 62 of the location sensor 30 may be determined by receiving the position from the GPS receiver and the orientation may be determined by the accelerometer. In one case, the electromagnetic field sensor 40 may be configured to communicate the sensed strength 44 to the base station 36 or the controller 20, and the base station 36 or controller 20 may be configured to determine the location 48 of the electromagnetic field sensor 40 relative to the base station 36 based on the sensed strength 44. Alternatively, the processor 50C of the electromagnetic field sensor 40 may be configured to determine the location 48 of the electromagnetic field sensor 40 relative to the base station 36 based on the sensed strength 44 and communicate the location 48 of the electromagnetic field sensor 40 relative to the base station 36, to the base station 36 or controller 20. In the former case, the HMD device 10 may lower a processing burden of the electromagnetic field sensor 40 by determining the relative location 48 itself, while in the latter case, performing the relative location determination processing or even some pre-processing at the electromagnetic field sensor 40 may lower a communication burden of the electromagnetic field sensor 40.

Figure 3:
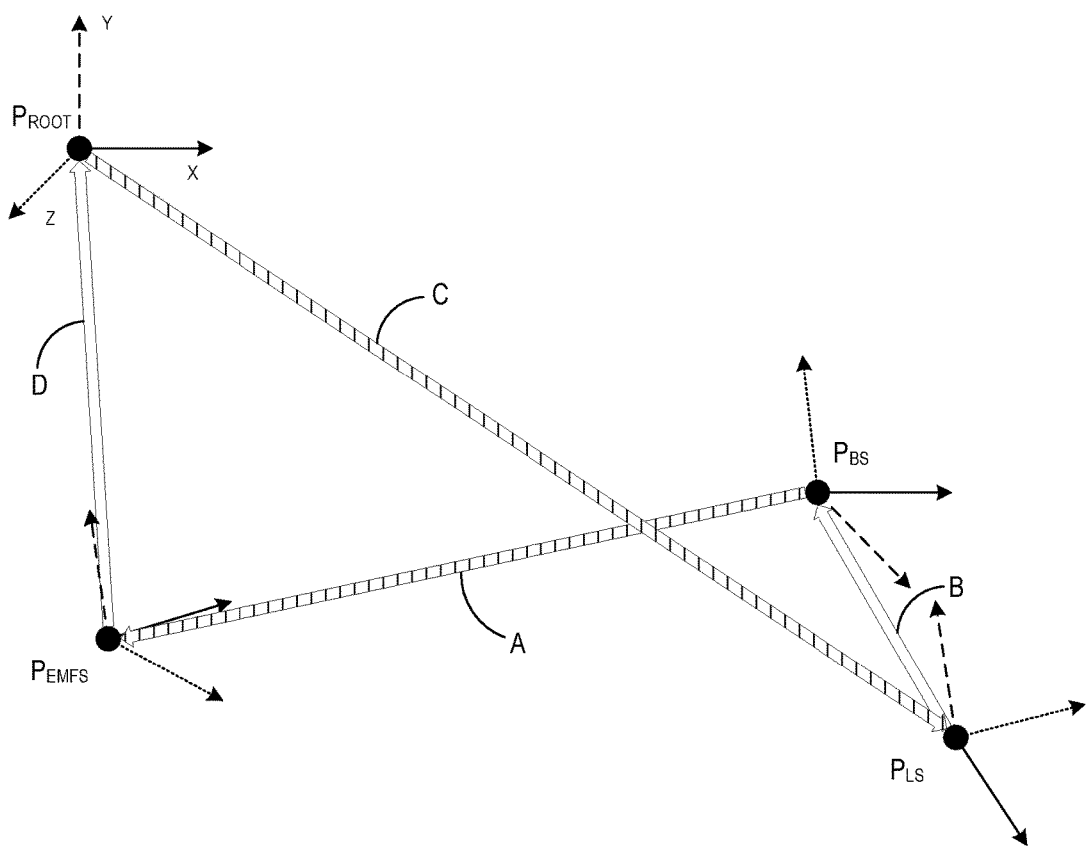
FIG. 3 shows an example calibration configuration for the mixed reality system.

FIG. 3 shows an example calibration configuration for the mixed reality system 100. During calibration, the electromagnetic field sensor 40 may be kept at a fixed position in the real world, denoted as $P_{EMFS}$. Measurements may be taken at precisely coordinated times by both the electromagnetic field sensor 40 and the location sensor 30 as the HMD device 10 is moved along a motion path that includes combined rotation and translation to cause changes in each value measured (X, Y, Z, pitch, roll, yaw) by the location sensor 30 to account for the effect that motion has on each value measured by the electromagnetic field sensor 40. Thus, the calibration may be performed by a robot in a factory where full six degree of freedom control can be ensured. In FIG. 3, like axes are shown with like lines to indicate varying orientations.

As the HMD device 10 is moved along the motion path, the measurements taken over time may include data relating to the location of the location sensor 30 ($P_{LS}$), the location of the base station 36 ($P_{BS}$), the location of the electromagnetic field sensor 40 ($P_{EMFS}$), and the location of an arbitrary fixed point in the real world relative to which the HMD device 10 reports its location ($P_{ROOT}$). This fixed point $P_{ROOT}$ may be, for example, the location of the HMD device 10 when it is turned on or a current software application starts, and the fixed point may be kept constant throughout an entire use session of the HMD device 10. The HMD device 10 may be considered to "tare" or "zero" its position in space by setting the fixed point $P_{ROOT}$ as the origin (0,0,0,0,0,0) and reporting the current location of the location sensor as coordinates relative thereto.

The measurements taken during calibration may include a matrix or transform A representing the temporarily-fixed real-world point $P_{EMFS}$ relative to the moving location $P_{BS}$, and a matrix or transform C representing the moving location $P_{LS}$ relative to the fixed real-world point $P_{ROOT}$. The matrix A may correspond to measurements taken by the electromagnetic field sensor 40 and the matrix C may correspond to measurements taken by the location sensor 30. In FIG. 3, transforms which are measured are shown as striped arrows, while previously unknown transforms to be calculated during calculation are shown as white arrows. The transforms A, B, C, and D form a closed loop in FIG. 3. Therefore, once sufficient data has been collected, an optimization algorithm may be performed to converge on a single solution for the matrices or transforms B and D in Equation 1 below, where I is an identity matrix of an appropriate size.

$$A \times B \times C \times D = I \qquad \text{Equation 1}$$

Solving for the matrix B may provide the predetermined offset 60, which may be six values including three dimensions of position and three dimensions of orientation, which may then be used during normal operation to align measurements of the electromagnetic field sensor 40 and the location sensor 30 to the same reference point. Thus, during normal operation of the HMD device 10, in order to determine the location 58 of the electromagnetic field sensor 40 in space, the processor 50A, 50B, or 50C may be configured to offset the location 62 of the location sensor 30 in space by the predetermined offset 60 to determine the location of the base station 36 in space. Then, the processor 50A, 50B, or 50C may be configured to offset the location of the base station 36 in space by the location 48 of the electromagnetic field sensor 40 relative to the base station 36.

Figure 4:
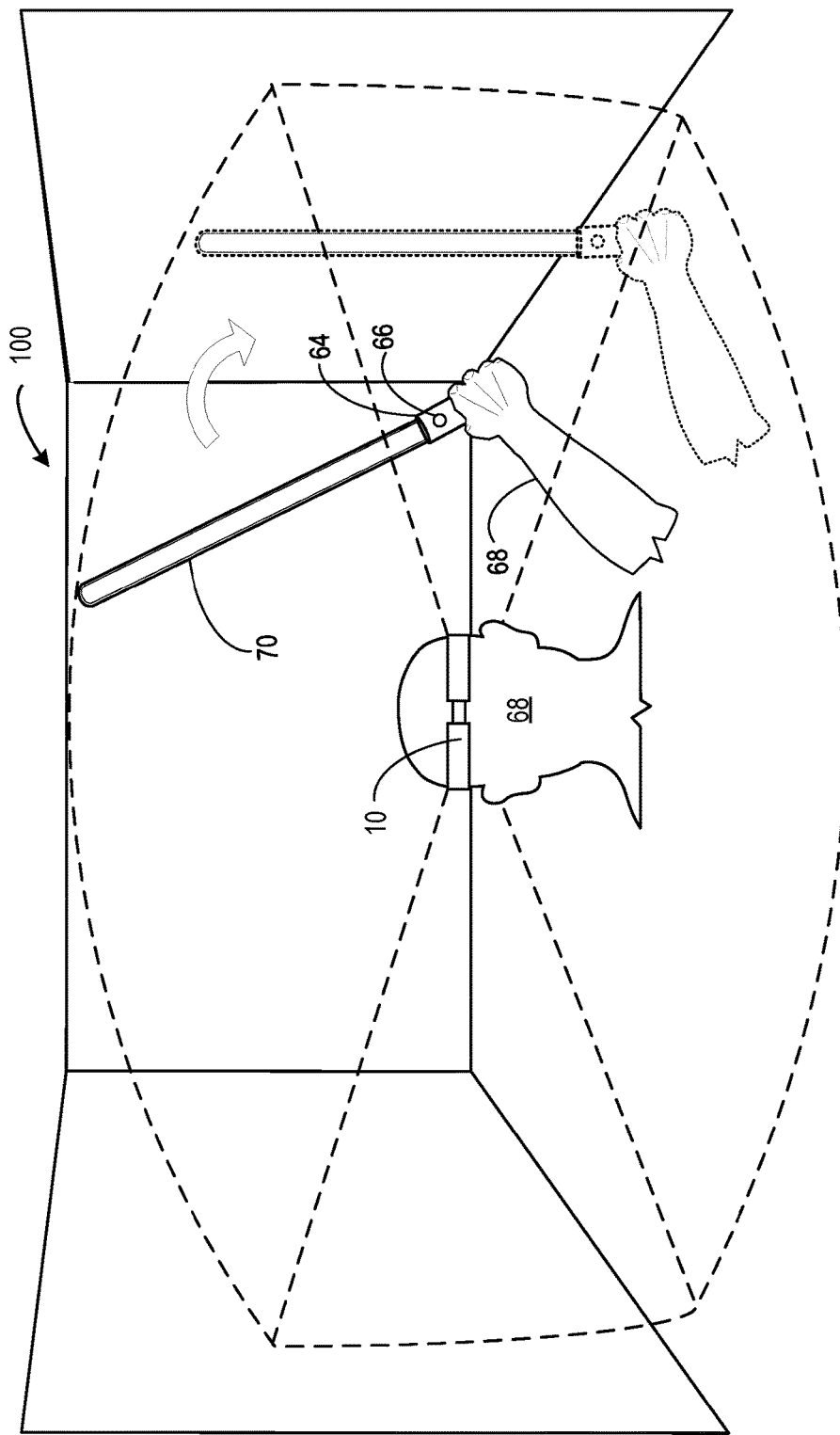
FIG. 4 shows an example augmented reality situation of the mixed reality system.

FIG. 4 shows an example augmented reality situation of the mixed reality system. As discussed above with reference to FIG. 1, the HMD device 10 may comprise the display 18 which may be an at least partially see-through display configured to display augmented reality images, which may be controlled by the controller 20. In the example shown, the object 42 may be a handheld input device 64 such as a video game controller configured to provide user input to the HMD device 10. To provide such functionality, the handheld input device 64 may comprise its own processor, memory, and transceiver, among other components, discussed below with reference to FIG. 10. The handheld input device 64 may also comprise one or more input controls 66 such as a button, trigger, joystick, directional pad, touch screen, accelerometer, gyroscope, etc.

In the example of FIG. 4, a user 68 may view an augmented reality scene with the HMD device 10, shown here in dashed lines. The user 68 may hold the handheld input device 64 with his hand and move the handheld input device 64 over time from a first position, shown in solid lines, to a second position, shown in dotted lines. By tracking the location 58 of the electromagnetic field sensor 40 of the handheld input device 64 as discussed above, the display 18 may be further configured to overlay a hologram 70 that corresponds to the location 58 of the electromagnetic field sensor 40 in space over time. In this example, the hologram 70 may be a glowing sword which incorporates the real handheld input device 64 as a hilt and follows the handheld input device 64 as it is waved around in space by the user 68. When rendering the virtual or augmented reality image, the mixed reality system 100 may experience increased accuracy and decreased latency compared to other HMD devices that use, for example, external cameras to locate objects. Furthermore, the depicted user 68 is free to move to other areas while continuing to wear and operate the HMD device 10 without disrupting the current use session or losing track of the handheld input device 64.

Figure 5:
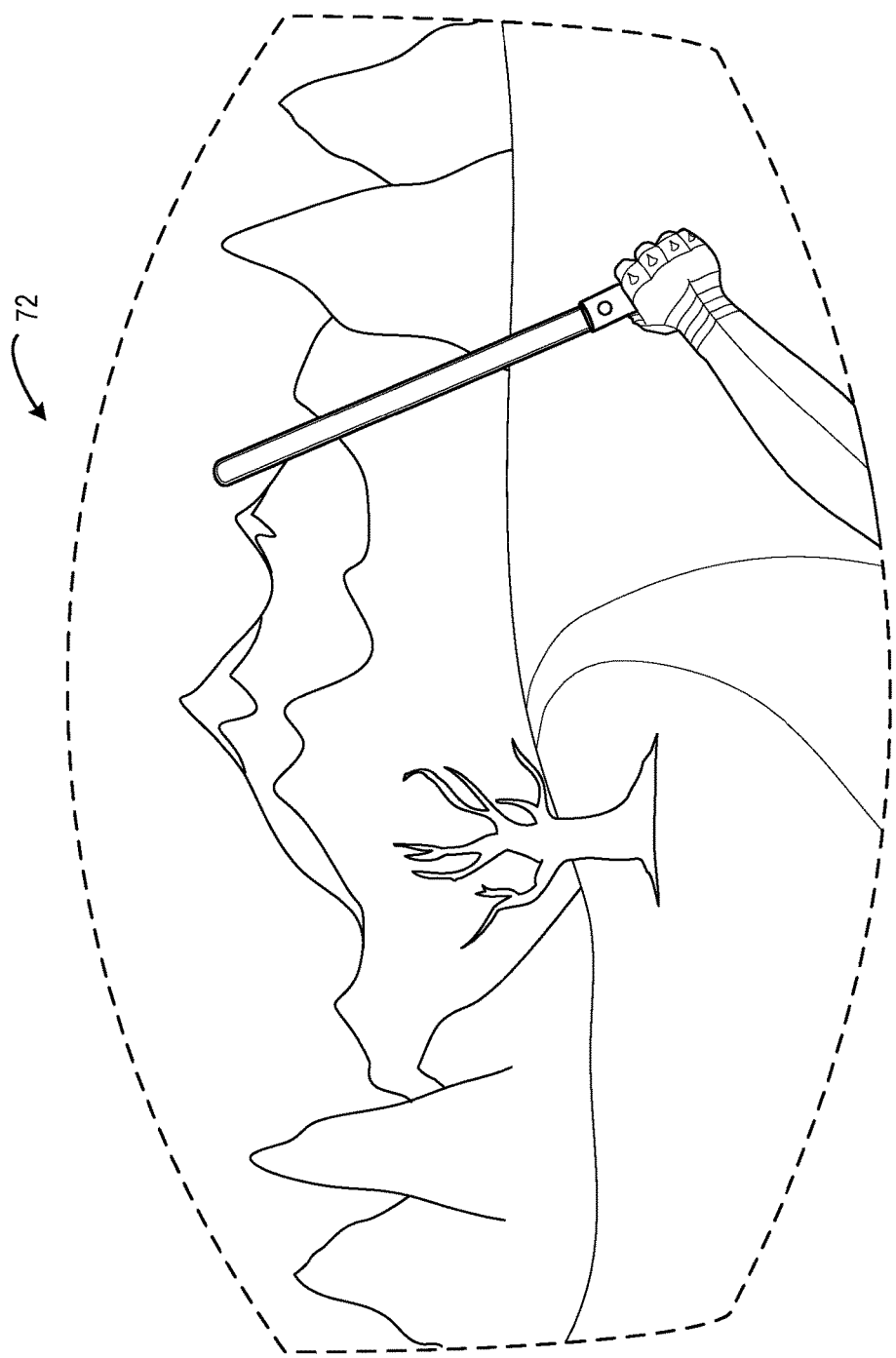
FIG. 5 shows an example virtual reality situation of the mixed reality system.

FIG. 5 shows an example virtual reality situation of the mixed reality system 100, similar to the augmented reality situation discussed above. As discussed above, the HMD device 10 may comprise the display 18 which may be an at least partially opaque display configured to display virtual reality images 72, and may further be a multimodal display which is configured to switch to an opaque, virtual reality mode. As above, the display 18 may be controlled by the controller 20. Rather than the hologram 70 in the augmented reality situation above, FIG. 5 shows virtual reality images 72 such as a tree and mountains in the background, a gauntlet which corresponds to the user's hand, and the glowing sword which moves together with the handheld input device 64 in the real world.

Figure 6:
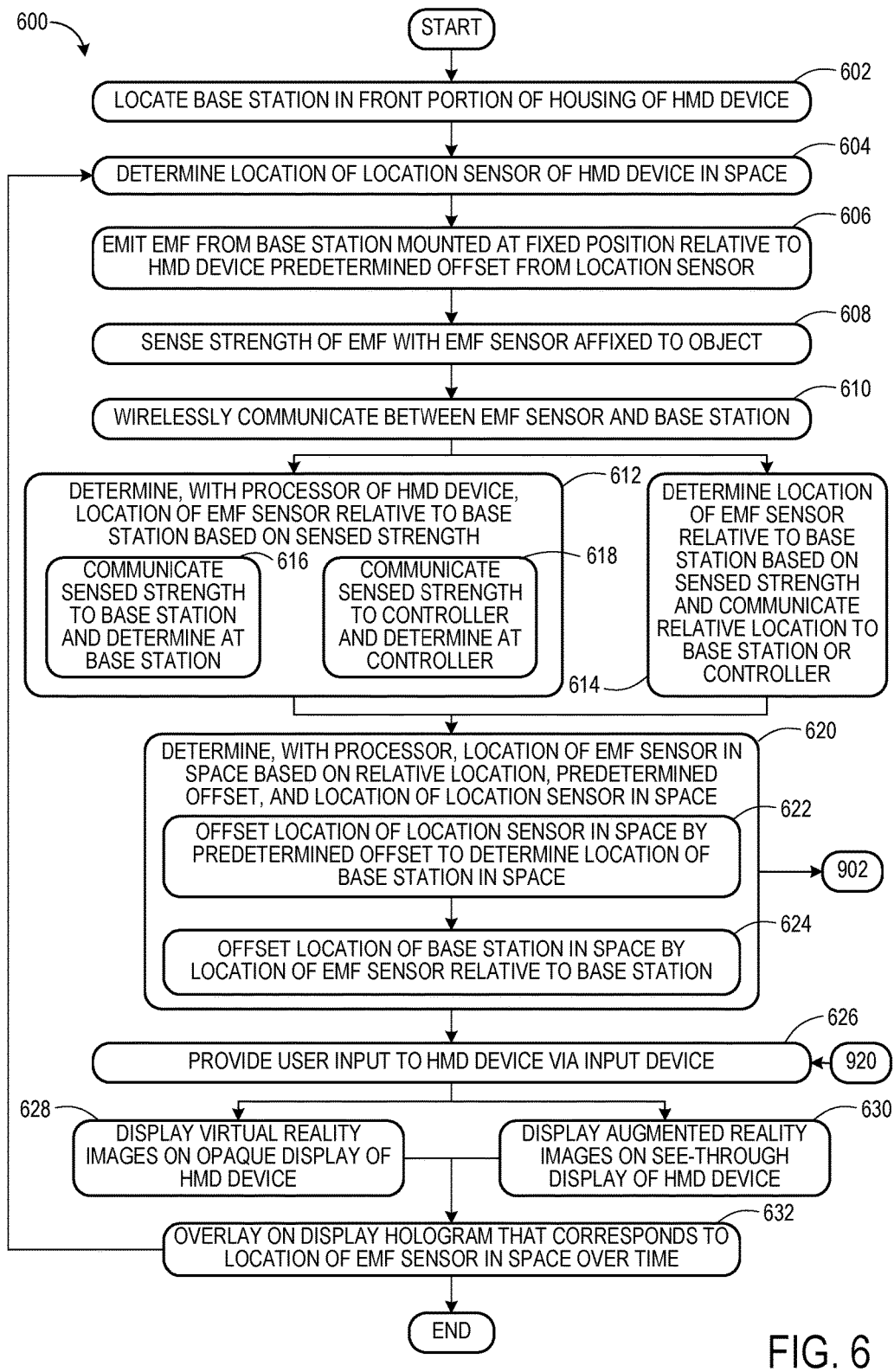
FIG. 6 shows a flowchart for a method of locating an object in the mixed reality system.

FIG. 6 shows a flowchart for a method 600 of locating an object in a mixed reality system. The following description of method 600 is provided with reference to the mixed reality system 100 described above and shown in FIG. 2. It will be appreciated that method 600 may also be performed in other contexts using other suitable components.

With reference to FIG. 6, at 602, the method 600 may include positioning a base station in a front portion of a housing of a head-mounted display (HMD) device. When the object to be located is located in front of a user wearing the HMD device, which is likely when the user is looking at or holding the object in her hands, positioning the base station in the front portion of the housing may increase accuracy, decrease noise filtering performed to calculate accurate values, and allow for a decrease in the range of the base station without negatively impacting performance. At 604, the method 600 may include determining a location of a location sensor of the HMD device in space. As mentioned above, the location sensor may include an accelerometer, a gyroscope, a global positioning system, a multilateration tracker, or one or more optical sensors such as a camera, among others. Depending on the type of sensor, the location sensor itself may be configured to determine the location, or the controller may be configured to calculate the location of the location sensor based on data received therefrom. In some instances, the location of the location sensor may be considered the location of the HMD device itself.

At 606, the method 600 may include emitting an electromagnetic field from the base station mounted at a fixed position relative to the HMD device a predetermined offset from the location sensor. The base station may be rigidly mounted near the location sensor to minimize movement between the sensors, and a precise value of the predetermined offset may be determined when calibrating the HMD device as discussed above. At 608, the method 600 may include sensing a strength of the electromagnetic field with an electromagnetic field sensor affixed to the object. The object may be an inert physical object, a living organism, or a handheld input device, for example.

At 610, the electromagnetic field sensor may comprise a transceiver and the method 600 may include wirelessly communicating between the electromagnetic field sensor and the base station. Alternatively, any of the base station, the electromagnetic field sensor, and a controller of the HMD device may be connected via a wired connection. At 612, the method 600 may include determining, with a processor of the HMD device, a location of the electromagnetic field sensor relative to the base station based on the sensed strength. Alternatively, at 614, the method 600 may include, at a processor of the electromagnetic field sensor, determining the location of the electromagnetic field sensor relative to the base station based on the sensed strength and then communicating the relative location to the base station or controller. In such a case, the processor of the HMD device, which may be of the base station or of the controller, may be considered to determine the relative location by receiving the relative location from the electromagnetic field sensor. If calculation is performed at a processor of the HMD device to determine the relative location at 612, then at 616, the method 600 may include communicating the sensed strength to the base station and determining, at the base station, the location of the electromagnetic field sensor relative to the base station based on the sensed strength. Similarly, at 618, the method 600 may include communicating the sensed strength to the controller and determining, at the controller, the location of the electromagnetic field sensor relative to the base station based on the sensed strength. Various determination processing may be distributed in a suitable manner among the various processors of the mixed reality system to lower the amount of raw data transmitted or lower the power of the processors included, for example.

At 620, the method 600 may include determining, with the processor, a location of the electromagnetic field sensor in space based on the relative location, the predetermined offset, and the location of the location sensor in space. In one example, determining the location of the electromagnetic field sensor in space at 620 may include, at 622, offsetting the location of the location sensor in space by the predetermined offset to determine a location of the base station in space, and at 624, offsetting the location of the base station in space by the location of the electromagnetic field sensor relative to the base station. As mentioned above, it will be appreciated that the "location" may include both position and orientation for a total of six values per location, and thus the offset may also include three dimensions of position and three dimensions of orientation. Further, for each of steps 620-624, the processor may be the processor of the base station or of the controller of the HMD device, or even of the electromagnetic field sensor in some cases. After determining the location of the electromagnetic field sensor in space at 620, the method may proceed to a method 900, discussed below with reference to FIG. 9, where the magnetic tracking system may be augmented to increase accuracy. The method 900 may eventually return to the method 600 at 626 so that the method 600 may be completed.

At 626, when the object is a handheld input device, the method 600 may include providing user input to the HMD device via the input device. In such a situation, the handheld input device may be used for six degree of freedom input. At 628, the method 600 may include displaying virtual reality images on an at least partially opaque display of the HMD device. At 630, the method 600 may include displaying augmented reality images on an at least partially see-through display of the HMD device. Whether opaque or see-through, the display may be controlled by the controller of the HMD device. As discussed above, the display may be configured to switch between opaque and see-through modes, or vary by degrees therebetween. Whether operating in an augmented reality mode or a virtual reality mode, at 632, the method 600 may include overlaying on the display a hologram that corresponds to the location of the electromagnetic field sensor in space over time. In order to constantly display the hologram at an updated location over time, the method 600 may return to 604 and repeat any of the steps therebetween. As the location of the electromagnetic field sensor changes, the controller may render images on the display to move the hologram in a corresponding manner, whether the hologram is directly overlaid on the location, is a fixed distance away from the location, or is a changing distance away from the location. In such a manner, the hologram may be seemingly seamlessly integrated with the real-world environment to the user.

Figure 7:
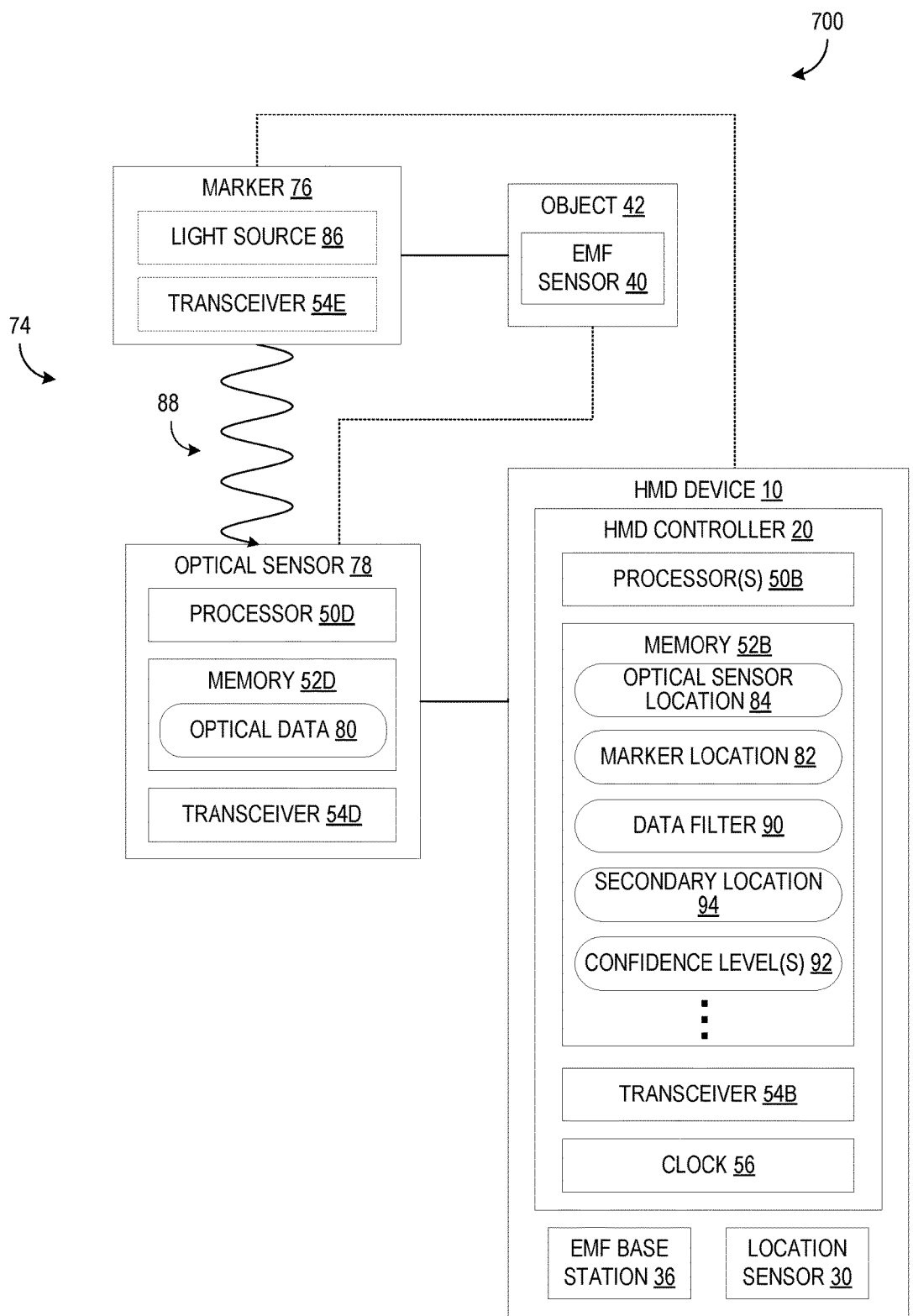
FIG. 7 shows an example software-hardware diagram of a mixed reality system including an optical tracking system.

FIG. 7 shows an example software-hardware diagram of a mixed reality system 700 including an optical tracking system. The mixed reality system 700 may include some or all components of the mixed reality system 100 of FIG. 2, and may additionally comprise an optical tracking system 74 comprising at least one marker 76 and at least one optical sensor 78 configured to capture optical data 80. Description of identical components and processes performed thereby will not be repeated, for brevity.

The optical sensor 78 may comprise a processor 50D, memory 52D, and transceiver 54D, or may utilize any of the processors 50A-C, memory 52A-C, and transceiver 54A-C as suitable. The optical data 80 captured by the optical sensor 78 may be stored in the memory 52D. The optical data 80 may be used by the processor 50D to determine a location 82 of the marker 76 and/or a location 84 of the optical sensor 78 that is transmitted to the HMD controller 20, or the optical data 80 itself may be transmitted to the HMD controller 20 so that the processor 50B may determine the locations 82, 84. The optical sensor 78 may be, for example, an image sensor such as an infrared camera, color camera, or depth camera, or a lidar device. The HMD device 10 is shown in FIG. 1 having a separate optical sensor 78 that may be an infrared camera, but it may instead utilize one of the sensors of the position sensor system 28, including the location sensor 30, if a suitable optical sensor is included. When the optical sensor 78 is a type of camera, the location 82 of the marker 76 may be determined through computer vision or image processing of an image or video captured by the optical sensor 78 of the marker 76. The location 82 of the marker 76 may be a relative location compared to the optical sensor 78 or a location in space. A relative location may be converted into a location in space by translating the location 82 based on a known location 84 of the optical sensor 78.

As shown in solid lines, the optical tracking system 74 may be configured with the at least one optical sensor 78 on the HMD device 10 and the at least one marker 76 on the object 42. In this case, the optical sensor 78, similar to the base station 36, may be located a fixed offset away from the location sensor 30, and the location 82 of the marker 76 can easily be determined based on the optical data 80, the location 84 of the optical sensor 78, and the fixed offset. Alternatively, as shown in dotted lines, the optical tracking system 74 may be configured with the at least one optical sensor 78 on the object 42 and the at least one marker 76 on the HMD device 10. In this case, the location 82 of the marker 76 may be a fixed offset away from the location sensor 30 on the HMD device 10, and the location 84 of the optical sensor 78 may be determined based on the optical data 80, the location 82 of the marker 76, and the fixed offset. In either case, the location of the portion of the optical tracking system 74 on the object 42 may be determined. FIG. 1 shows either the optical sensor 78 or the marker(s) 76, drawn in dashed lines, being included in the HMD device 10.

The marker 76 may comprise a light source 86 configured to actively emit light 88, referred to herein as an active marker. The light 88 may be of a corresponding type to be detected by the optical sensor 78, for example, infrared light with an infrared camera, visible light with a color camera, etc. With the light source 86, the active marker 76 may be controlled to emit only at certain times, in a specified pattern, at a specified brightness, or in a specified color, etc. This may decrease failed or mistaken recognition of the marker 76 and increase the accuracy of the optical tracking system 74. In this case, the marker 76 may include a transceiver 54E to communicate with a processor in control of operating the light source 86, or the marker 76 may be wired thereto directly. Alternatively, the marker 76 may be reflective, referred to herein as a passive marker. The passive marker 76 may reflect the light 88 due to inclusion of a reflective film, or retro-reflective tape or paint in its construction, for example. If the optical tracking system 74 is able to accurately track the location 82 of the passive marker 76, then the mixed reality system 700 may experience lower energy usage as compared to a situation in which an active marker 76 is used. In addition, the transceiver 54E may be omitted from the marker 76 when the marker 76 is reflective, lowering the power and processing burden of the HMD device 10 or object 42.

The processor 50B be further configured to augment the magnetic tracking system 45 based on the optical data 80 and the location 84, 82 of the optical sensor 78 or marker 76, whichever is located on the object 42. The processor 50B may use a data filter 90 to perform sensor fusion of the optical tracking system 74 and the magnetic tracking system 45. The data filter 90 may be, for example, a Kalman filter or other algorithm(s) capable of estimating confidence and weighting multiple data streams. In one example, the processor 50B may be configured to determine a plurality of possible locations of the electromagnetic field sensor 40 in space using the magnetic tracking system 45 and disambiguate between the possible locations using the optical data 80 from the optical tracking system 74 and the data filter 90. The plurality of possible locations may be determined because electromagnetic field sensors and base stations are typically each formed of three orthogonal coils, one for each coordinate axis, and the magnetic tracking system 45 may tend to track within one hemisphere at a time. In some cases, the magnetic tracking system 45 may be unable to resolve the phase difference and determine which possible location is false. When tracking over time, the base station 36, or whichever specific processor is configured to determine the location 58 from the sensed strength 44, may assume that the current location is most likely to be near an immediately previously determined location rather than one in the opposite hemisphere.

However, if the object 42 is temporarily moved beyond the transmission range of the base station 36, then the magnetic tracking system 45 may not be able to disambiguate between the possible locations on its own. Thus, the optical tracking system 74 may augment the magnetic tracking system 45 by disambiguating between the possible locations and determining the most likely location. Disambiguating between the possible locations may comprise comparing the possible locations to where the location 58 of the electromagnetic field sensor 40 could be expected to likely be based on the location 84 of the optical sensor 78 or the location 82 of the marker 76, whichever component of the optical tracking system 74 is located on the object 42, and a second predetermined offset between the optical component and the electromagnetic field sensor 40. The possible location that most closely matches the expected location based on the optical tracking system 74 may be determined to be the actual location of the electromagnetic field sensor 40.

In another example, in order to augment the magnetic tracking system 45, the processor 50B may be configured to determine that a confidence level 92 of the location 58 of the electromagnetic field sensor 40 in space determined using the magnetic tracking system 45 is less than a predetermined threshold, and determine a secondary location 94 of the electromagnetic field sensor 40 in space using the optical tracking system 74. The secondary location 94 may be estimated based on the location 82 or 84 determined by the optical tracking system 74, which may be the second predetermined offset from the electromagnetic field sensor 40. The processor 50B may be configured to execute the data filter 90 to compare the confidence level 92 to the threshold. When the confidence level 92 meets or exceeds the threshold, the processor 50B may be configured to use the location 58 from the magnetic tracking system 45 as the true location when performing further actions based on the location of the object 42, such as displaying holograms that move together with the object 42. When the confidence level 92 is less than the threshold, the processor 50B may be configured to instead use the secondary location 94 from the optical tracking system 74. In some instances, the confidence level 92 may be determined at least in part by comparing the location 58 to the secondary location 94, where a low confidence level 92 corresponds to a large difference between locations and a high confidence level 92 corresponds to a small difference between locations.

The data filter 90 may be used to determine which data stream to prioritize over the other based on the confidence level 92 of each system, which may result in lowering the power of the non-prioritized system, or even turning the system off. For example, the magnetic tracking system 45 may fail due to ambient interference or close proximity to a large piece of metal, and may be unreliable near the edge of the transmission range of the base station 36. When the confidence level 92 is determined to be below the threshold, the processor 50B may use the secondary location 94 from the optical tracking system 74, and may additionally lower the sampling rate of the electromagnetic field sensor 40 while the data from the magnetic tracking system 45 is considered unreliable. Alternatively, the base station 36 may be configured to change the frequency of the emitted electromagnetic field 38 in response to failing to meet the confidence threshold. A different frequency may reduce interference and increase accuracy of subsequent tracking by the magnetic tracking system 45. In some cases, the magnetic tracking system 45 may be a primary system, the optical tracking system 74 may be a secondary system, and the mixed reality system 700 may comprise a tertiary system such as an inertial measurement unit (IMU) 96, discussed below, and the processor 50B may use inertial data from the IMU 96, or other data from another tertiary system, to further supplement the determination and confirmation of the location 58.

The threshold may consist of multiple thresholds with various actions performed after each threshold is failed or met. For example, the base station 36 may change frequency after failing to meet a first threshold, the data filter 90 may prioritize the second location from the optical tracking system 74 over the location 58 from the magnetic tracking system 45 after failing to meet a second threshold, and the magnetic tracking system 45 may be temporarily turned off after failing to meet a third threshold. The confidence level 92 may be calculated based on a variety of factors. For example, the confidence level may be based at least on a change in the location 58 of the electromagnetic field sensor 40 in space over time. If the location 58 moves too quickly or erratically over time to likely be accurate, then the confidence level may be lowered. As another example, the object 42 may be detected to be approaching the limit of the electromagnetic field 38 and the confidence level 92 may be lowered in response. The proximity of the object 42 to the limit may be determined based on the location 58 determined by the magnetic tracking system 45, the secondary location 94 determined by the optical tracking system 74, and/or a known approximate limit of the base station 36 corresponding to factory calibrated settings, adjusted settings, and power input, for example.

Figure 8A:
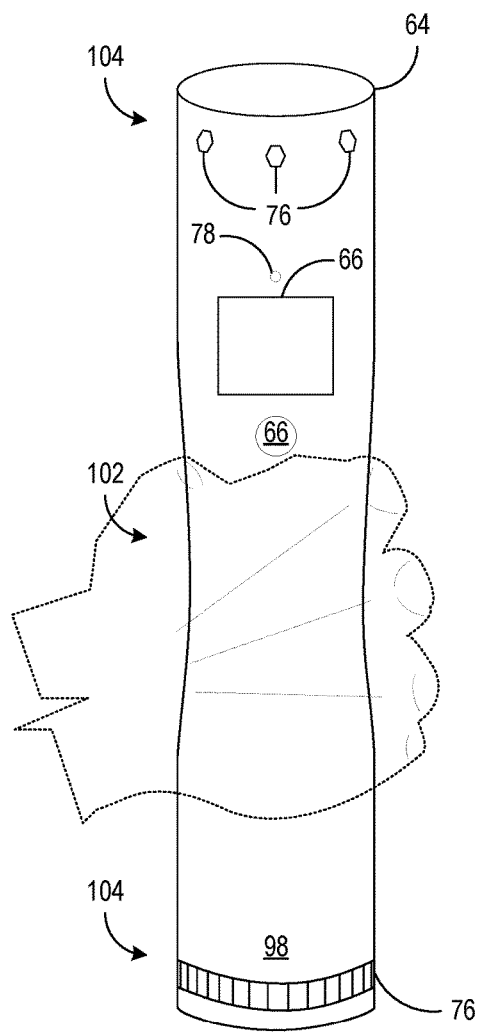
FIGS. 8A and 8B respectively show front and back views of an example handheld input device of the mixed reality system.
Figure 8B:
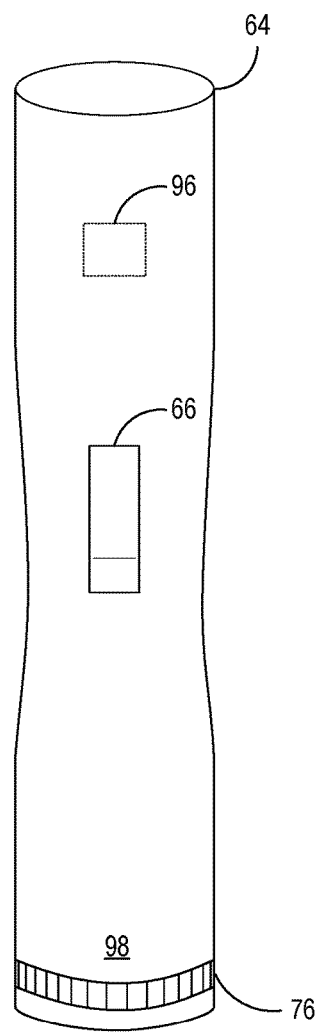

As discussed above, the object 42 may be a handheld input device 64 configured to provide user input to the HMD device 10. FIGS. 8A and 8B respectively show front and back views of an example handheld input device 64 of the mixed reality system 700. FIGS. 8A and 8B show several examples of the input controls 66 mentioned above. A touch screen and button are shown in FIG. 8 while a trigger is shown in FIG. 8B. The handheld input device 64 also may include the HMD 96 mentioned above, which itself may be used as an input controls 66 responsive to movement in three dimensions and rotation in three dimensions for a total of six degrees of freedom. The IMU 96 may comprise a sensor suite including a gyroscope and accelerometer, and optionally a magnetometer. The IMU 96 may be configured to measure a change in acceleration with the accelerometer and a change in orientation (pitch, roll, and yaw) with the gyroscope, and may use data from the magnetometer to adjust for drift.

In this example, the handheld input device 64 may comprise a housing 98 including a grip area 102 and the at least one marker 76 or the at least one optical sensor 78 may be located on at least one protuberance 104 that extends outside of the grip area 102. The marker(s) may be located on only one protuberance 104 or on two or more if more are present. Locating the marker(s) 76 on the protuberance 104 may reduce instances of occlusion of the marker(s) by the user's hand, which is generally located in the grip area 102. The example in FIG. 8A shows multiple markers 76. Some markers 76, such as those on the top protuberance 104, are placed intermittently around the circumference of the protuberance 104 and do not extend fully around to the back side of the handheld input device 64, as shown in FIG. 8B. The markers 76 on the bottom protuberance 104 are examples of markers that extend fully around the circumference of the protuberance 104. The upper markers 76 may each comprise a light source such as a light-emitting diode (LED), while the lower markers 76 may be reflective. Alternatively, the markers 76 may be located on the HMD device 10 and the optical sensor 78 may be located on the handheld input device 64, as shown in dashed lines.

Figure 9:
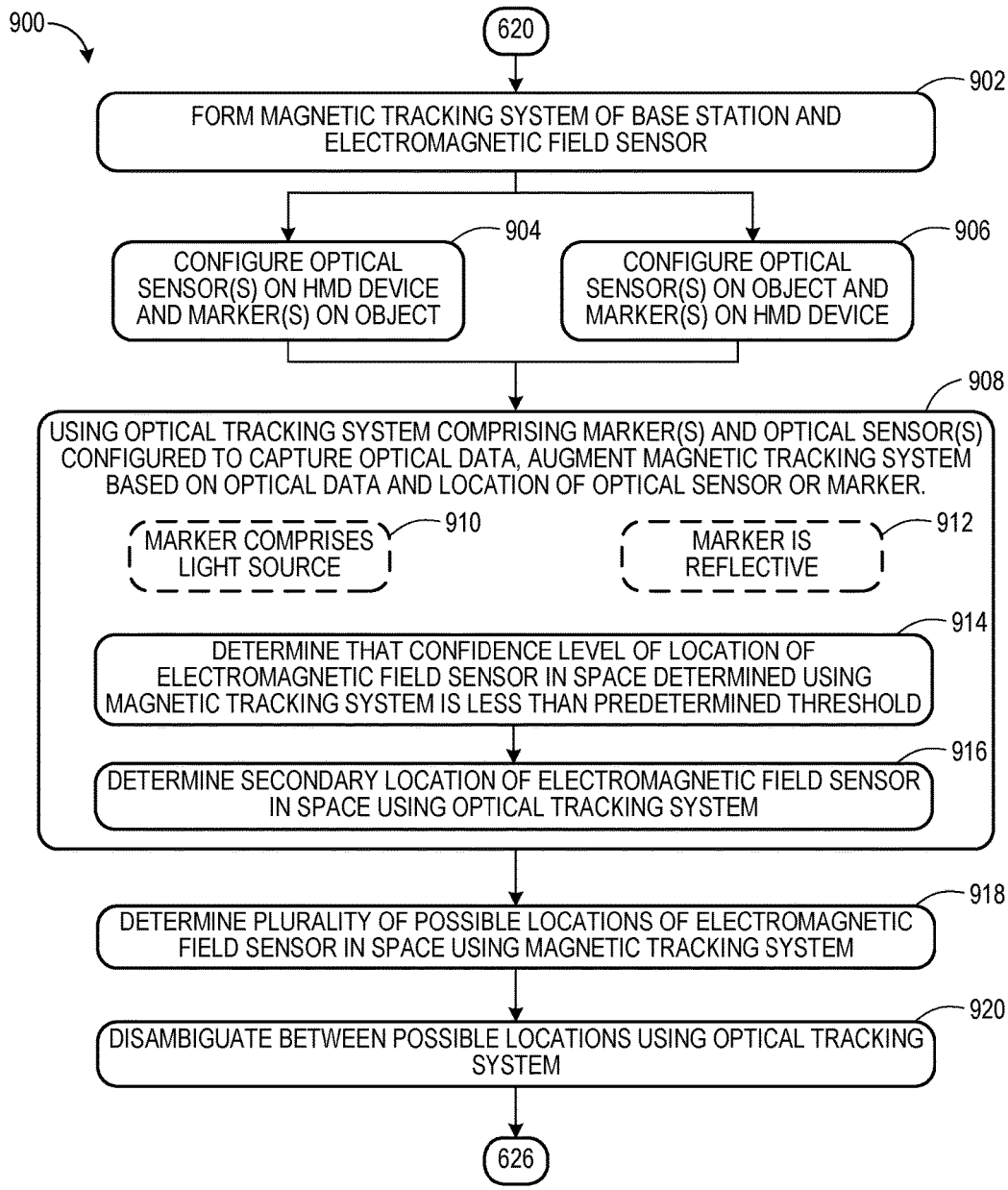
FIG. 9 shows a flowchart for a method of augmenting the method of FIG. 6.

FIG. 9 shows a flowchart for a method 900 of locating an object in a mixed reality system. The method 900 may continue from the method 600 and may return to the method 600 upon completion. The following description of method 900 is provided with reference to the mixed reality system 70 described above and shown in FIG. 7. It will be appreciated that method 900 may also be performed in other contexts using other suitable components.

As discussed above, the method 600 may include determining, with the processor, the location of the electromagnetic field sensor in space based on the relative location, the predetermined offset, and the location of the location sensor in space at 620. At 902, the base station and electromagnetic field sensor together may form a magnetic tracking system. At 904, the method 900 may include configuring at least one optical sensor on the HMD device and at least one marker on the object; alternatively, at 906, the method 900 may include configuring the at least one optical sensor on the object and the at least one marker on the HMD device. In one example, the optical sensor may be placed on the component that has other uses for the optical sensor beyond locating the object to avoid adding a single-purpose sensor, and the marker may be placed on the component with the lower power capacity to lower power consumption.

At 908, the method 900 may include using optical tracking system comprising the at least one marker and the at least one optical sensor configured to capture optical data, augmenting the magnetic tracking system based on the optical data and a location of the optical sensor or marker. In doing so, at 910, the marker may comprise a light source; alternatively, at 912, the marker may be reflective. A light source may emit a brighter, focused light compared to a reflective marker, thereby increasing detection accuracy, but may also use more power. Further, at 914, augmenting the magnetic tracking system may comprise determining that a confidence level of the location of the electromagnetic field sensor in space determined using the magnetic tracking system is less than a predetermined threshold, and at 916, determining a secondary location of the electromagnetic field sensor in space using the optical tracking system. As discussed above, the magnetic tracking system may become unreliable and data from the optical tracking system may be prioritized when the threshold is not met.

As discussed previously, at 626, the object may be a handheld input device configured to provide user input to the HMD device. With the optical tracking system included, the handheld input device may comprise a housing including a grip area and the at least one marker or the at least one optical sensor may be located on at least one protuberance that extends outside of the grip area. In such a manner, the marker(s) and optical sensor(s) may be able to communicate reliably without interference from the user's hand.

At 918, the method 900 may include determining a plurality of possible locations of the electromagnetic field sensor in space using the magnetic tracking system. The plurality of possible locations may include one true location and one or more false locations. At 920, the method 900 may include disambiguating between the possible locations using the optical tracking system. As discussed above, this may include assuming that the current location is most likely to be near an immediately previously determined location rather than one of the other possible locations that is farther away. After 920, the method 900 may return to the method 600 at 626, although it will be appreciated that the methods 600 and 900 may be combined in other suitable manners.

The above mixed reality systems and methods of locating an object therein may utilize a magnetic tracking system consisting of a paired electromagnetic base station and sensor to track the object affixed to the sensor, and an optical tracking system consisting of a paired optical sensor and marker to augment the magnetic tracking system. The optical tracking system may serve to provide points of reference to disambiguate between multiple locations calculated by the magnetic tracking system, or data from both systems may be weighted dynamically as each system becomes more or less reliable due to changing circumstances. The mixed reality system thus may intelligently reduce power in unreliable systems and quickly respond to the changing position of the object when rendering graphics tethered to the object, increasing the quality of the user experience.

In some embodiments, the methods and processes described herein may be tied to a computing system of one or more computing devices. In particular, such methods and processes may be implemented as a computer-application program or service, an application-programming interface (API), a library, and/or other computer-program product.

Figure 10:
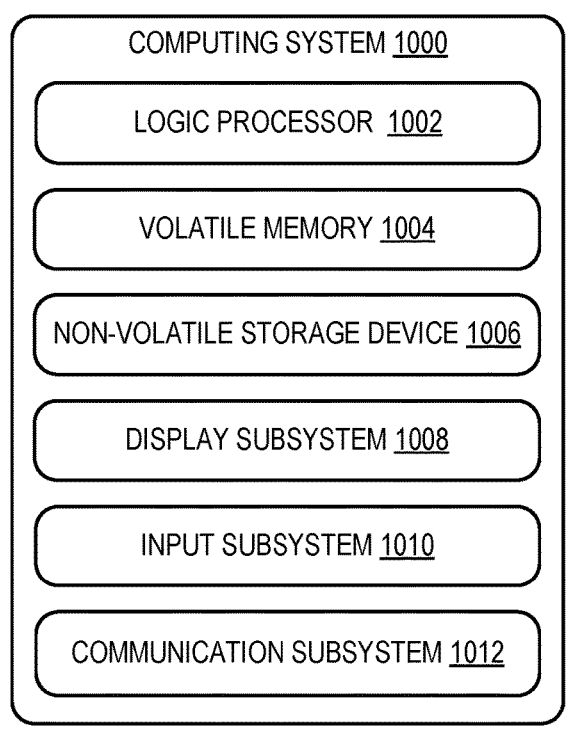
FIG. 10 shows a computing system according to an embodiment of the present description.

FIG. 10 schematically shows a non-limiting embodiment of a computing system 1000 that can enact one or more of the methods and processes described above. Computing system 1000 is shown in simplified form. Computing system 1000 may take the form of one or more head-mounted display devices as shown in FIG. 1, or one or more devices cooperating with a head-mounted display device (e.g., personal computers, server computers, tablet computers, home-entertainment computers, network computing devices, gaming devices, mobile computing devices, mobile communication devices (e.g., smart phone), the handheld input device 64, and/or other computing devices).

Computing system 1000 includes a logic processor 1002, volatile memory 1004, and a non-volatile storage device 1006. Computing system 1000 may optionally include a display subsystem 1008, input subsystem 1010, communication subsystem 1012, and/or other components not shown in FIG. 10.

Logic processor 1002 includes one or more physical devices configured to execute instructions. For example, the logic processor may be configured to execute instructions that are part of one or more applications, programs, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 1002 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 1006 includes one or more physical devices configured to hold instructions executable by the logic processors to implement the methods and processes described herein. When such methods and processes are implemented, the state of non-volatile storage device 1006 may be transformed—e.g., to hold different data.

Non-volatile storage device 1006 may include physical devices that are removable and/or built-in. Non-volatile storage device 1006 may include optical memory (e.g., CD, DVD, HD-DVD, Blu-Ray Disc, etc.), semiconductor memory (e.g., ROM, EPROM, EEPROM, FLASH memory, and/or magnetic memory (e.g., hard-disk drive, floppy-disk drive, tape drive, MRAM, etc.), or other mass storage device technology. Non-volatile storage device 1006 may include nonvolatile, dynamic, static, read/write, read-only, sequential-access, location-addressable, file-addressable, and/or content-addressable devices. It will be appreciated that non-volatile storage device 1006 is configured to hold instructions even when power is cut to the non-volatile storage device 1006.

Volatile memory 1004 may include physical devices that include random access memory. Volatile memory 1004 is typically utilized by logic processor 1002 to temporarily store information during processing of software instructions. It will be appreciated that volatile memory 1004 typically does not continue to store instructions when power is cut to the volatile memory 1004.

Aspects of logic processor 1002, volatile memory 1004, and non-volatile storage device 1006 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 1000 implemented to perform a particular function. In some cases, a module, program, or engine may be instantiated via logic processor 1002 executing instructions held by non-volatile storage device 1006, using portions of volatile memory 1004. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 1008 may be used to present a visual representation of data held by non-volatile storage device 1006. This visual representation may take the form of a graphical user interface (GUI). As the herein described methods and processes change the data held by the non-volatile storage device, and thus transform the state of the non-volatile storage device, the state of display subsystem 1008 may likewise be transformed to visually represent changes in the underlying data. Display subsystem 1008 may include one or more display devices utilizing virtually any type of technology. Such display devices may be combined with logic processor 1002, volatile memory 1004, and/or non volatile storage device 1006 in a shared enclosure, or such display devices may be peripheral display devices. The at least partially opaque or see-through display of HMD device 10 described above is one example of a display subsystem 1008.

When included, input subsystem 1010 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; any of the sensors described above with respect to position sensor system 28 of FIG. 1; and/or any other suitable sensor.

When included, communication subsystem 1012 may be configured to communicatively couple computing system 1000 with one or more other computing devices. Communication subsystem 1012 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 1000 to send and/or receive messages to and/or from other devices via a network such as the Internet.

Figure 11:
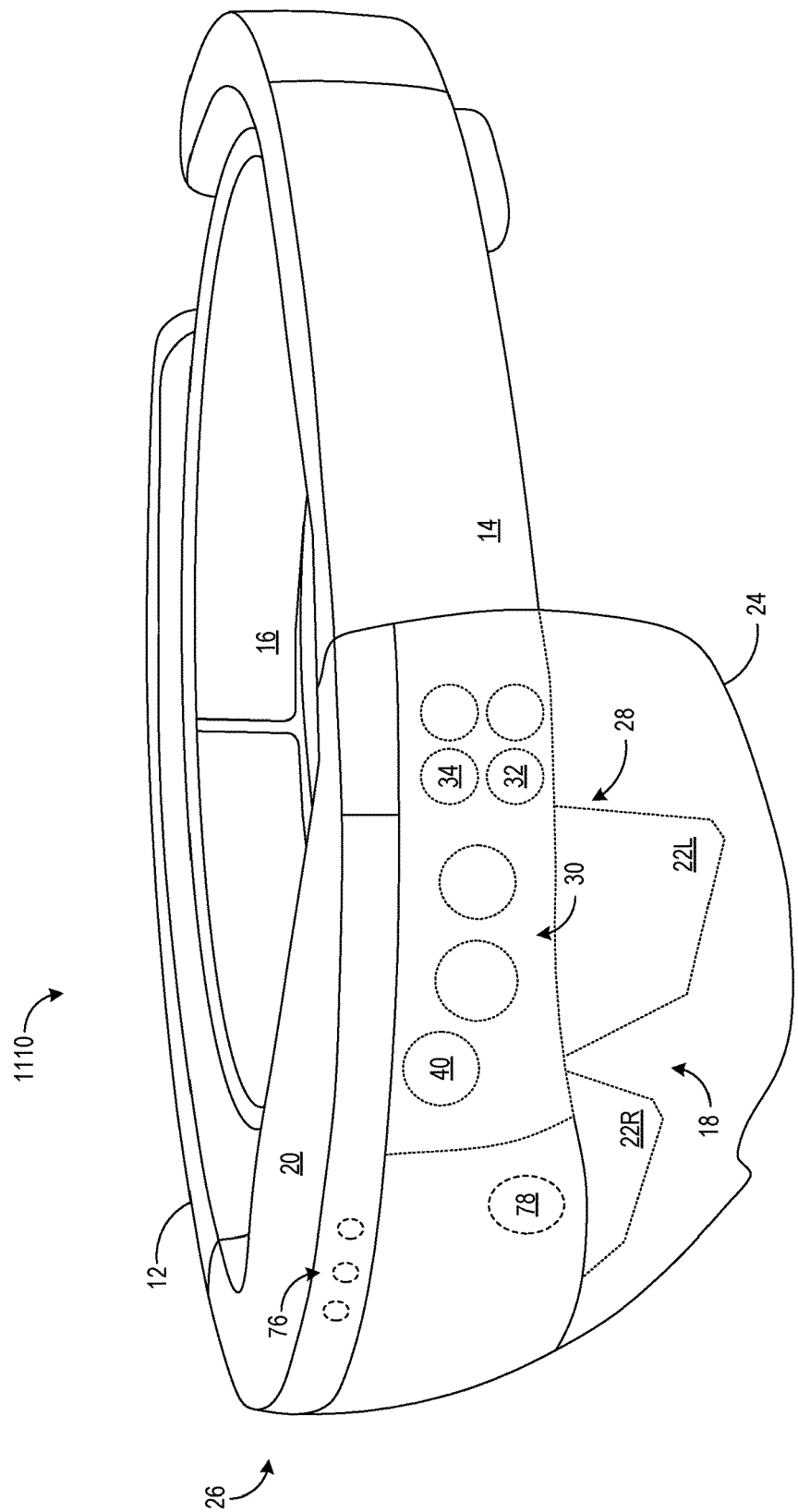
FIG. 11 shows a schematic illustration of an HMD device according to an alternative configuration.
Figure 12:
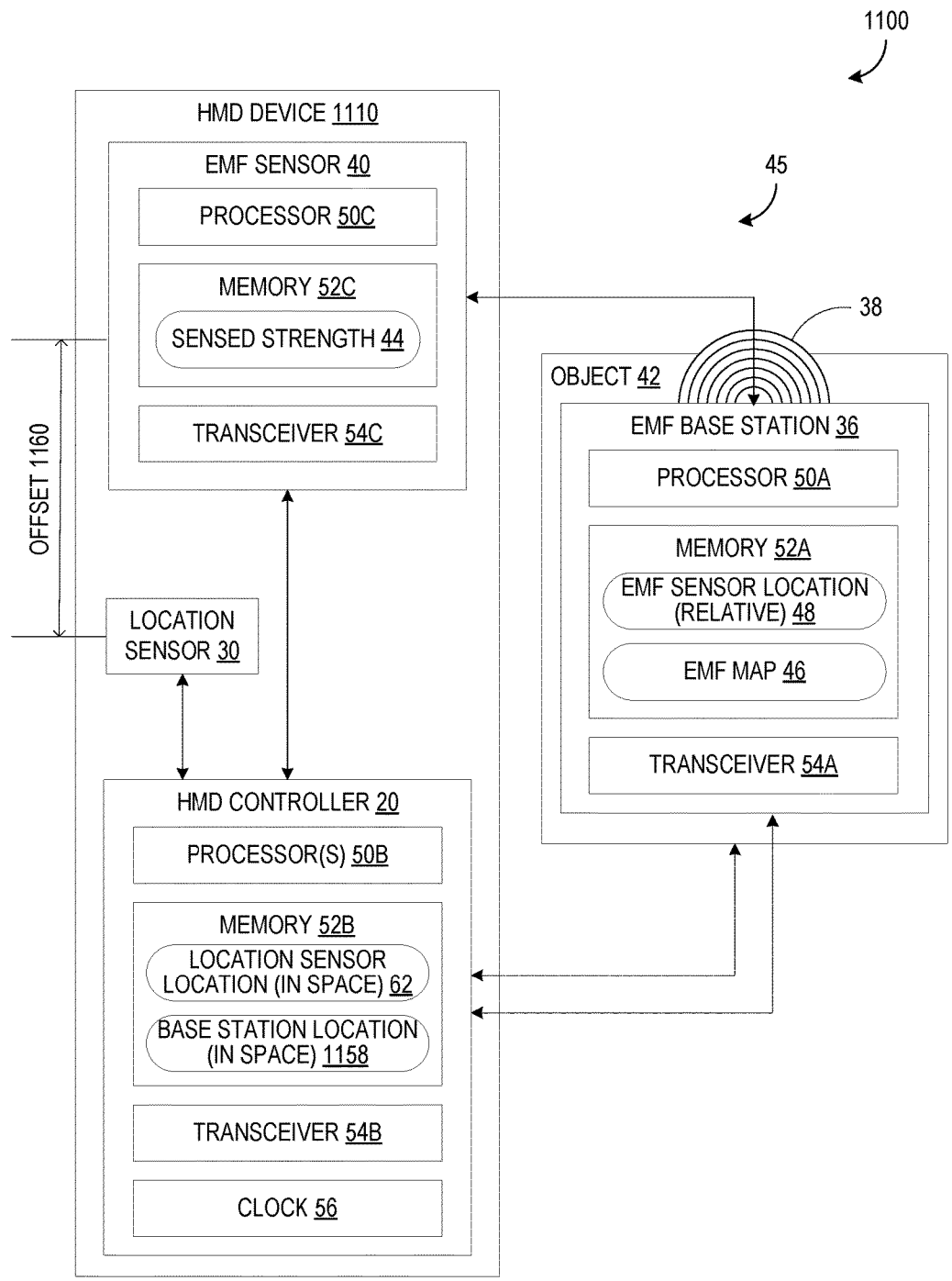
FIG. 12 shows an example software-hardware diagram of a mixed reality system including the HMD device according to the alternative configuration.

The above description is of a mixed reality system 100 of a first configuration in which the HMD device 10 comprises the base station 36 and the electromagnetic field sensor 40 is affixed to the object 42. However, FIG. 11 shows a schematic illustration of an HMD device 1110 according to an alternative configuration, and FIG. 12 shows an example software-hardware diagram of a mixed reality system 1100 including the HMD device 1110 according to the alternative configuration. In the alternative configuration, many components are substantially the same as in the first configuration and therefore description thereof will not be repeated. According to the alternative configuration, the mixed reality system 1100 may comprise the base station 36 affixed to the object 42 and configured to emit the electromagnetic field 38, and the HMD device 1110 may comprise the electromagnetic field sensor 40 mounted at a fixed position relative to the HMD device 1110 a predetermined offset 1160 from the location sensor 30 and configured to sense the strength 44 of the electromagnetic field 38. After the relative location 48 of the electromagnetic field sensor 40 is determined as discussed above, the processor 50A, 50B, or 50C may be configured to determine a location 1158 of the base station 36 in space based on the relative location 48, the predetermined offset 1160, and the location 62 of the location sensor 30 in space.

Figure 13:
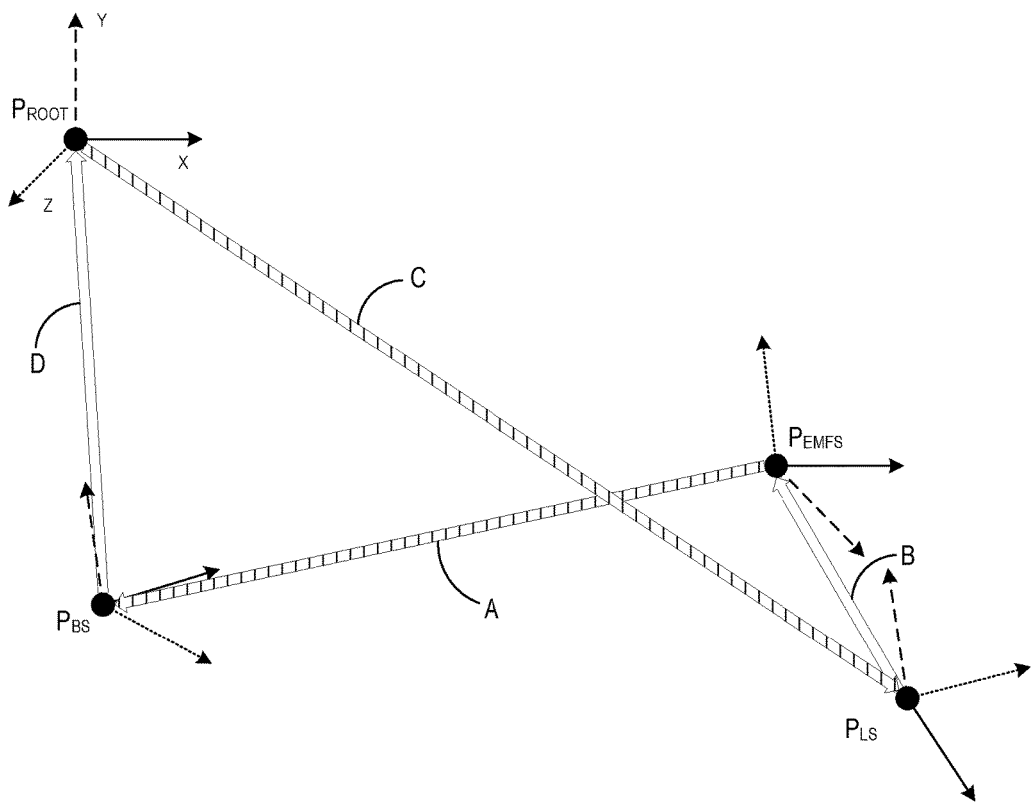
FIG. 13 shows an example calibration configuration for the mixed reality system according to the alternative configuration.

FIG. 13 shows an example calibration configuration for the mixed reality system 1100 according to the alternative configuration. Calibration is similar to the calibration for the first configuration, except that $P_{BS}$ and $P_{EMFS}$ are switched. To account for the matrix A transforming from $P_{EMFS}$ to $P_{BS}$, the sensed strength may be used to determine the location of the base station 36 relative to the electromagnetic field sensor 40, inverted from the relative location 48.

Figure 14:
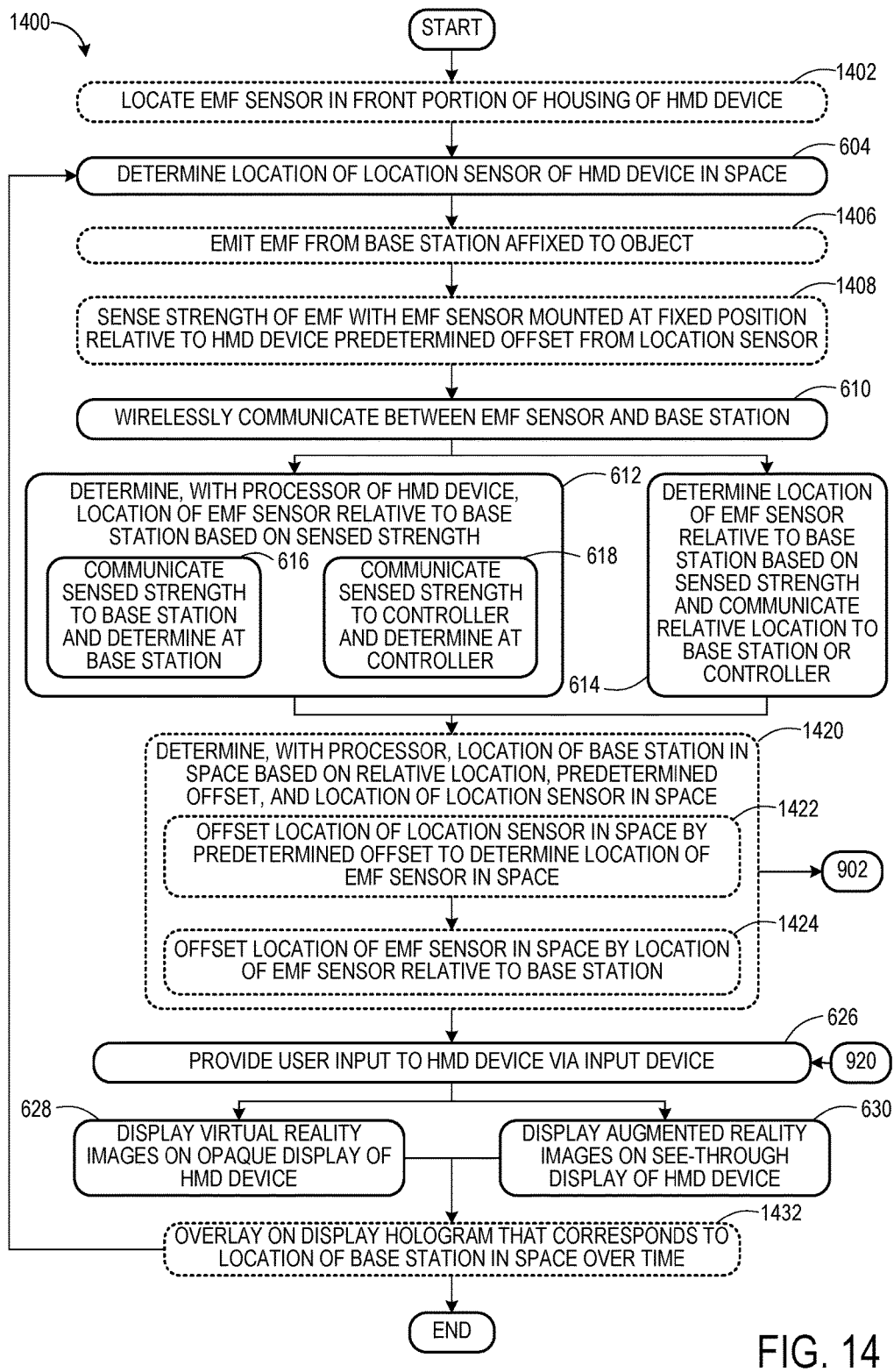
FIG. 14 shows a flowchart for a method of locating an object the mixed reality system according to the alternative configuration.

FIG. 14 shows a flowchart for a method 1400 of locating an object in the mixed reality system according to the alternative configuration. The steps of method 1400 correspond to the steps of method 600 except where shown in dotted lines in FIG. 14, and description of duplicate steps will not be repeated.

With reference to FIG. 14, at 1402, the method 1400 may include locating an electromagnetic field sensor in a front portion of a housing of an HMD device. At 1406, the method 1400 may include emitting an electromagnetic field from a base station affixed to the object. At 1408, the method 1400 may include sensing a strength of the electromagnetic field with an electromagnetic field sensor mounted at a fixed position relative to the HMD device a predetermined offset from the location sensor. At 1420, the method 1400 may include determining, with a processor of the HMD device, a location of the electromagnetic field sensor relative to the base station based on the sensed strength. In one example, determining the location of the base station in space at 1420 may include, at 1422, offsetting the location of the location sensor in space by the predetermined offset to determine the location of the electromagnetic field sensor in space, and at 1424, offsetting the location of the electromagnetic field sensor in space by the location of the electromagnetic field sensor relative to the base station. Finally, at 1432, the method 1400 may include overlaying on a display a hologram that corresponds to the location of the base station in space over time.

Figure 15:
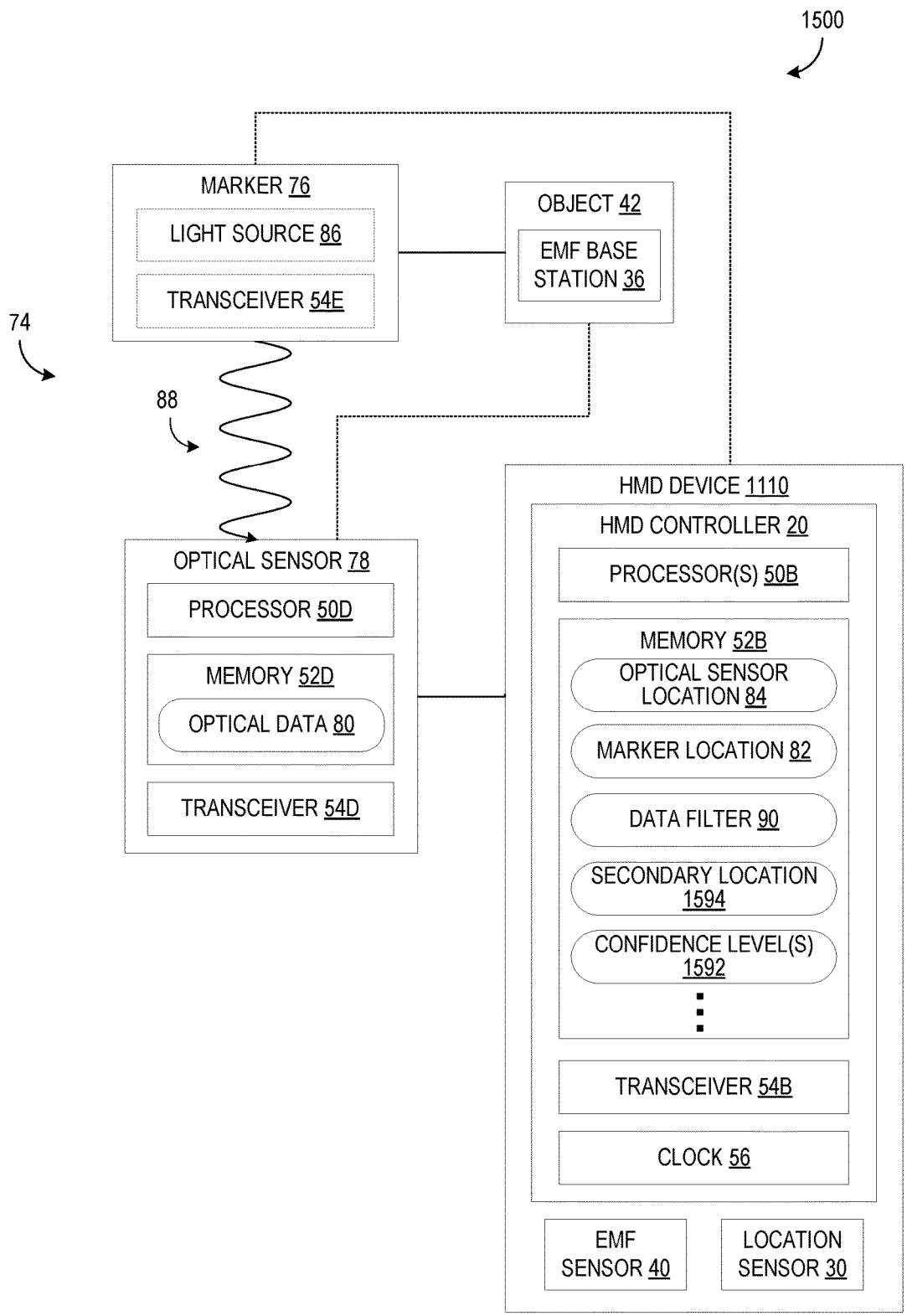
FIG. 15 shows an example software-hardware diagram of a mixed reality system including an optical tracking system according to the alternative configuration.

FIG. 15 shows an example software-hardware diagram of a mixed reality system 1500 including the optical tracking system 74 according to the alternative configuration. Similarly to the first configuration above, the processor 50A, 50B, or 50C may be configured to determine a plurality of possible locations of the base station 36 in space using the magnetic tracking system 45 and disambiguate between the possible locations using the optical tracking system 74. In one example, in order to augment the magnetic tracking system 45, the processor 50A, 50B, or 50C is configured to determine that a confidence level 1592 of the location 1158 of the base station 36 in space determined using the magnetic tracking system 45 is less than the predetermined threshold. The confidence level may be based at least on a change in the location 1158 of the base station 36 in space over time. Then, the processor 50A, 50B, and 50C may be configured to determine a secondary location 1594 of the base station 36 in space using the optical tracking system 74.

Figure 16:
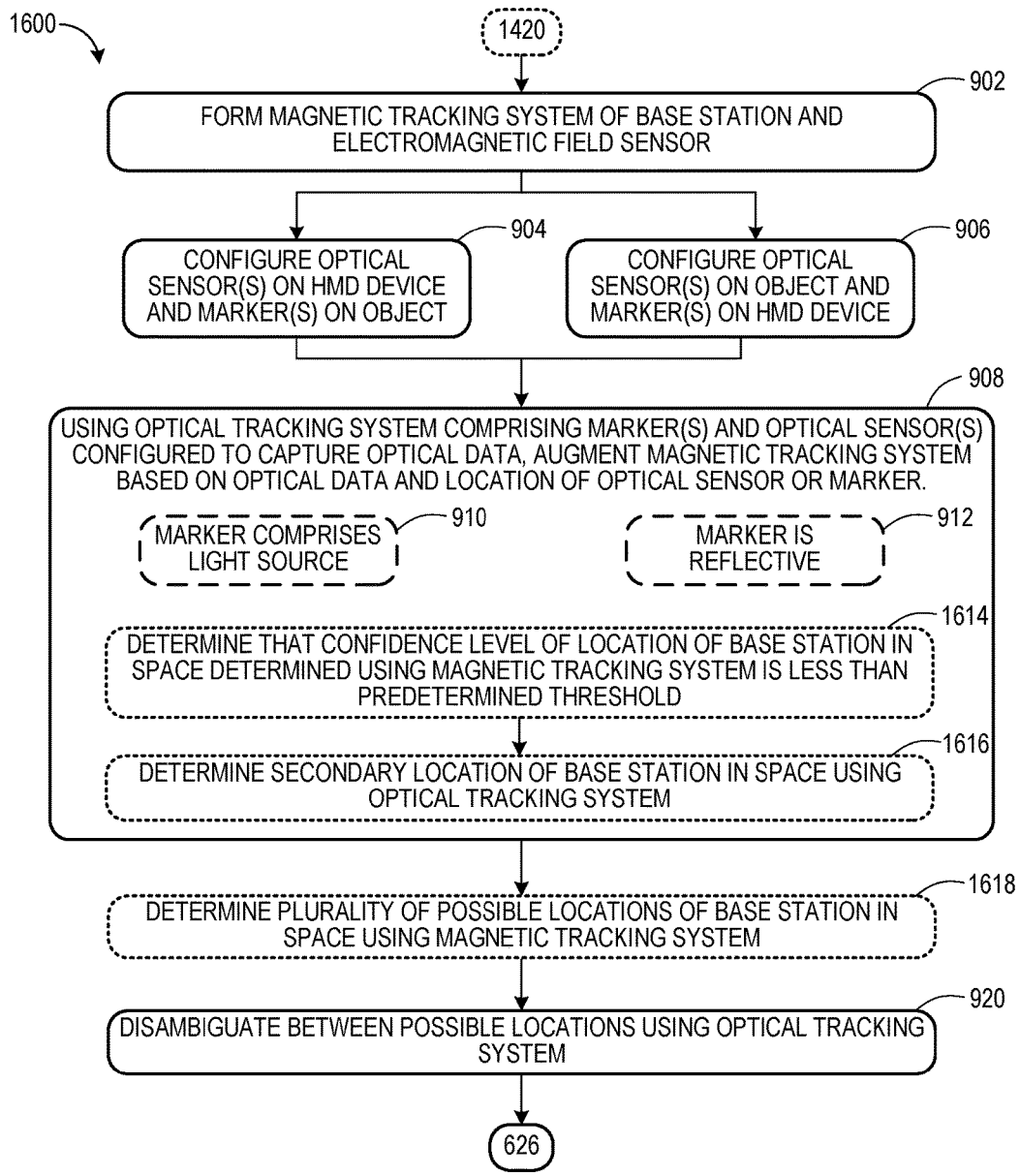
FIG. 16 shows a flowchart for a method of augmenting the method of FIG. 14.

FIG. 16 shows a flowchart for a method 1600 of augmenting the method 1400 of FIG. 14. The steps of method 1600 correspond to the steps of method 900 except where shown n dotted lines in FIG. 16, and description of duplicate steps will not be repeated.

As discussed above, the method 1400 may include determining, with a processor of the HMD device, a location of the electromagnetic field sensor relative to the base station based on the sensed strength at 1420. The method 1600 may begin thereafter, at 902, or at another suitable point. At 1614, the method 900 may include determining that a confidence level of the location of the base station in space determined using the magnetic tracking system is less than a predetermined threshold. At 1616, the method 1600 may include determining a secondary location of the base station in space using the optical tracking system. Further, at 1618, the method 1600 may include determining a plurality of possible locations of the base station in space using the magnetic tracking system.

Although the configurations described above include one HMD device 10, 1110 and one object 42, more than one may be included in the mixed reality system. For example, a user may wear the HMD device 10, 1110 and hold one handheld input device 64 as the object 42 in each hand. In such a situation, the HMD device 10, 1110 may be configured to overlay respective holograms 70 on the display 18 that independently track each handheld input device 64. The magnetic tracking system 45 may be configured with the base station 36 on one handheld input device 64, one electromagnetic field sensor 40 on the other handheld input device 64, and an additional electromagnetic field sensor 40 on the HMD device 1110. The HMD device 10 may instead include the base station 36, but placing it on one of the handheld input devices 64 frees up space and uses less power on the HMD device 1110. The HMD device 1110 may determine the locations of each handheld input device 64 or portions of the calculations in making the determinations may be distributed among various processors in the mixed reality system as discussed above. Furthermore, the number of handheld input devices 64 is not limited to two and may be any suitable number. The handheld input devices 64 may be operated by multiple users as well.

In one alternative example, each handheld input device 64 may comprise its own base station 36 configured to emit an electromagnetic field 38 at a respective frequency, thereby avoiding interference with each other. The HMD device 1110 then comprises an electromagnetic sensor 40 to complete the magnetic tracking system 45. These multi-object systems are not limited to handheld input devices 64 and may instead include other types of objects 42. Further, as with the single-object mixed reality systems discussed above, the multi-object systems may also comprise the optical tracking system 74 which may be distributed in any suitable manner. For example, the HMD 10, 1110 may comprise the optical sensor 78 and each handheld input device 64 may comprise the optical marker(s) 76, the HMD 10, 1110 may comprise the optical marker(s) 76 and each handheld input device 64 may comprise the optical sensor 78, or the HMD 10, 1110 and one handheld input device 64 may comprise the optical sensor 78 while the other handheld input device 64 comprises the optical marker(s) 76. Using both tracking systems together in a multi-object system may increase accuracy by disambiguating between magnetic or optical input from multiple sources.

The subject matter of the present disclosure is further described in the following paragraphs. One aspect provides a mixed reality system comprising a head-mounted display (HMD) device comprising a location sensor from which the HMD device determines a location of the location sensor in space, and a base station mounted at a fixed position relative to the HMD device a predetermined offset from the location sensor and configured to emit an electromagnetic field. The mixed reality system may further comprise an electromagnetic field sensor affixed to an object and configured to sense a strength of the electromagnetic field, the base station and electromagnetic field sensor together forming a magnetic tracking system. The HMD device may include a processor configured to determine a location of the electromagnetic field sensor relative to the base station based on the sensed strength, and determine a location of the electromagnetic field sensor in space based on the relative location, the predetermined offset, and the location of the location sensor in space. The mixed reality system may comprise an optical tracking system comprising at least one marker and at least one optical sensor configured to capture optical data, and the processor may be further configured to augment the magnetic tracking system based on the optical data and a location of the optical sensor or marker. In this aspect, the optical tracking system may be configured with the at least one optical sensor on the HMD device and the at least one marker on the object. In this aspect, the optical tracking system may be configured with the at least one optical sensor on the object and the at least one marker on the HMD device. In this aspect, the marker may comprise a light source. In this aspect, the marker may be reflective. In this aspect, the processor may be configured to determine a plurality of possible locations of the electromagnetic field sensor in space using the magnetic tracking system, and disambiguate between the possible locations using the optical tracking system. In this aspect, the object may be a handheld input device configured to provide user input to the HMD device. In this aspect, the handheld input device may comprise a housing including a grip area and the at least one marker or the at least one optical sensor is located on at least one protuberance that extends outside of the grip area. In this aspect, in order to augment the magnetic tracking system, the processor may be configured to determine that a confidence level of the location of the electromagnetic field sensor in space determined using the magnetic tracking system is less than a predetermined threshold, and determine a secondary location of the electromagnetic field sensor in space using the optical tracking system. In this aspect, the confidence level may be based at least on a change in the location of the electromagnetic field sensor in space over time.

According to another aspect, a method of locating an object in a mixed reality system may comprise determining a location of a location sensor of a head-mounted display (HMD) device in space, emitting an electromagnetic field from a base station mounted at a fixed position relative to the HMD device a predetermined offset from the location sensor, sensing a strength of the electromagnetic field with an electromagnetic field sensor affixed to the object, the base station and electromagnetic field sensor together forming a magnetic tracking system, determining, with a processor of the HMD device, a location of the electromagnetic field sensor relative to the base station based on the sensed strength, determining, with the processor, a location of the electromagnetic field sensor in space based on the relative location, the predetermined offset, and the location of the location sensor in space, and using an optical tracking system comprising at least one marker and at least one optical sensor configured to capture optical data, augmenting the magnetic tracking system based on the optical data and a location of the optical sensor or marker. In this aspect, the method may further comprise configuring the at least one optical sensor on the HMD device and the at least one marker on the object. In this aspect, the method may further comprise configuring the at least one optical sensor on the object and the at least one marker on the HMD device. In this aspect, the marker may comprise a light source. In this aspect, the marker may be reflective. In this aspect, the method may further comprise determining a plurality of possible locations of the electromagnetic field sensor in space using the magnetic tracking system, and disambiguating between the possible locations using the optical tracking system. In this aspect, the object may be a handheld input device configured to provide user input to the HMD device. In this aspect, the handheld input device may comprise a housing including a grip area and the at least one marker or the at least one optical sensor is located on at least one protuberance that extends outside of the grip area. In this aspect, augmenting the magnetic tracking system may comprise determining that a confidence level of the location of the electromagnetic field sensor in space determined using the magnetic tracking system is less than a predetermined threshold, and determining a secondary location of the electromagnetic field sensor in space using the optical tracking system.

According to another aspect, a mixed reality system may comprise a head-mounted display (HMD) device comprising a location sensor from which the HMD device determines a location of the location sensor in space, a base station mounted at a fixed position relative to the HMD device a predetermined offset from the location sensor and configured to emit an electromagnetic field, at least one optical sensor configured to capture optical data, and an at least partially see-through display configured to display augmented reality images. The mixed reality system may further comprise an electromagnetic field sensor affixed to an object and configured to sense a strength of the electromagnetic field, the base station and electromagnetic field sensor together forming a magnetic tracking system, and at least one marker on the object, the optical sensor and the marker together forming an optical tracking system. The object may include a processor configured to determine a location of the electromagnetic field sensor relative to the base station based on the sensed strength, the HMD device may include a processor configured to determine a location of the electromagnetic field sensor in space based on the relative location, the predetermined offset, and the location of the location sensor in space, and augment the magnetic tracking system based on the optical data and a location of the optical sensor or marker, and the at least partially see-through display may be configured to overlay a hologram that corresponds to the location of the electromagnetic field sensor in space over time.

According to another aspect, a mixed reality system may comprise a base station affixed to an object and configured to emit an electromagnetic field, and a head-mounted display (HMD) device comprising a location sensor from which the HMD device determines a location of the location sensor in space and an electromagnetic field sensor mounted at a fixed position relative to the HMD device a predetermined offset from the location sensor and configured to sense a strength of the electromagnetic field, the base station and electromagnetic field sensor together forming a magnetic tracking system. The HMD device may comprise a processor configured to determine a location of the electromagnetic field sensor relative to the base station based on the sensed strength, and determine a location of the base station in space based on the relative location, the predetermined offset, and the location of the location sensor in space. The mixed reality system may comprise an optical tracking system comprising at least one marker and at least one optical sensor configured to capture optical data, and the processor may be further configured to augment the magnetic tracking system based on the optical data and a location of the optical sensor or marker. In this aspect, the optical tracking system may be configured with the at least one optical sensor on the HMD device and the at least one marker on the object. In this aspect, the optical tracking system may be configured with the at least one optical sensor on the object and the at least one marker on the HMD device. In this aspect, the marker may comprise a light source. In this aspect, the marker may be reflective. In this aspect, the processor may be configured to determine a plurality of possible locations of the base station in space using the magnetic tracking system, and disambiguate between the possible locations using the optical tracking system. In this aspect, the object may be a handheld input device configured to provide user input to the HMD device. In this aspect, the handheld input device may comprise a housing including a grip area and the at least one marker or the at least one optical sensor may be located on at least one protuberance that extends outside of the grip area. In this aspect, in order to augment the magnetic tracking system, the processor may be configured to determine that a confidence level of the location of the base station in space determined using the magnetic tracking system may be less than a predetermined threshold, and determine a secondary location of the base station in space using the optical tracking system. In this aspect, the confidence level may be based at least on a change in the location of the base station in space over time.

According to another aspect, a method of locating an object in a mixed reality system may comprise determining a location of a location sensor of a head-mounted display (HMD) device in space, emitting an electromagnetic field from a base station affixed to the object, sensing a strength of the electromagnetic field with an electromagnetic field sensor mounted at a fixed position relative to the HMD device a predetermined offset from the location sensor, the base station and electromagnetic field sensor together forming a magnetic tracking system, determining, with a processor of the HMD device, a location of the electromagnetic field sensor relative to the base station based on the sensed strength, determining, with the processor, a location of the base station in space based on the relative location, the predetermined offset, and the location of the location sensor in space, and using an optical tracking system comprising at least one marker and at least one optical sensor configured to capture optical data, augmenting the magnetic tracking system based on the optical data and a location of the optical sensor or marker. In this aspect, the method may further comprise configuring the at least one optical sensor on the HMD device and the at least one marker on the object. In this aspect, the method may further comprise configuring the at least one optical sensor on the object and the at least one marker on the HMD device. In this aspect, the marker may comprise a light source. In this aspect, the marker may be reflective. In this aspect, the method may further comprise determining a plurality of possible locations of the base station in space using the magnetic tracking system, and disambiguating between the possible locations using the optical tracking system. In this aspect, the object may be a handheld input device configured to provide user input to the HMD device. In this aspect, the handheld input device may comprise a housing including a grip area and the at least one marker or the at least one optical sensor may be located on at least one protuberance that extends outside of the grip area. In this aspect, augmenting the magnetic tracking system may comprise determining that a confidence level of the location of the base station in space determined using the magnetic tracking system may be less than a predetermined threshold, and determining a secondary location of the base station in space using the optical tracking system.

According to another aspect, a mixed reality system may comprise a base station affixed to an object and configured to emit an electromagnetic field, a head-mounted display (HMD) device comprising a location sensor from which the HMD device determines a location of the location sensor in space, an electromagnetic field sensor mounted at a fixed position relative to the HMD device a predetermined offset from the location sensor and configured to sense a strength of the electromagnetic field, the base station and electromagnetic field sensor together forming a magnetic tracking system, at least one optical sensor configured to capture optical data, and an at least partially see-through display configured to display augmented reality images. The mixed reality system may further comprise at least one marker on the object, the optical sensor and the marker together forming an optical tracking system. The HMD device may include a processor configured to determine a location of the electromagnetic field sensor relative to the base station based on the sensed strength, determine a location of the base station in space based on the relative location, the predetermined offset, and the location of the location sensor in space, and augment the magnetic tracking system on the optical data and a location of the optical sensor or marker. The at least partially see-through display may be configured to overlay a hologram that corresponds to the location of the base station in space over time.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A mixed reality system comprising:
    a head-mounted display (HMD) device comprising:
        a location sensor from which the HMD device determines a location of the location sensor in space; and
        a base station mounted at a fixed position relative to the HMD device a non-zero predetermined offset from the location sensor and configured to emit an electromagnetic field; and
    an electromagnetic field sensor affixed to an object and configured to sense a strength of the electromagnetic field, the base station and electromagnetic field sensor together forming a magnetic tracking system;
    wherein the HMD device includes a processor configured to:
        determine a location of the electromagnetic field sensor relative to the base station based on the sensed strength;
        determine a location of the electromagnetic field sensor in space based on the relative location, the predetermined offset, and the location of the location sensor in space;
        determine that a confidence level of the location of the electromagnetic field sensor in space determined using the magnetic tracking system is less than a predetermined threshold; and
        determine a secondary location of the electromagnetic field sensor in space using the optical tracking system;
    wherein the mixed reality system comprises an optical tracking system comprising at least one marker and at least one optical sensor configured to capture optical data, and the processor is further configured to augment the magnetic tracking system based on the optical data and a location of the optical sensor or marker.

2. The mixed reality system of claim 1, wherein the optical tracking system is configured with the at least one optical sensor on the HMD device and the at least one marker on the object.

3. The mixed reality system of claim 1, wherein the optical tracking system is configured with the at least one optical sensor on the object and the at least one marker on the HMD device.

4. The mixed reality system of claim 1, wherein the marker comprises a light source.

5. The mixed reality system of claim 1, wherein the marker is reflective.

6. The mixed reality system of claim 1, wherein the processor is configured to:
    determine a plurality of possible locations of the electromagnetic field sensor in space using the magnetic tracking system; and
    disambiguate between the possible locations using the optical tracking system.

7. The mixed reality system of claim 1, wherein the object is a handheld input device configured to provide user input to the HMD device.

8. The mixed reality system of claim 7, wherein the handheld input device comprises a housing including a grip area and the at least one marker or the at least one optical sensor is located on at least one protuberance that extends outside of the grip area.

9. The mixed reality system of claim 1, wherein the confidence level is based at least on a change in the location of the electromagnetic field sensor in space over time.

10. A method of locating an object in a mixed reality system, the method comprising:
    determining a location of a location sensor of a head-mounted display (HMD) device in space;
    emitting an electromagnetic field from a base station mounted at a fixed position relative to the HMD device a non-zero predetermined offset from the location sensor;
    sensing a strength of the electromagnetic field with an electromagnetic field sensor affixed to the object, the base station and electromagnetic field sensor together forming a magnetic tracking system;
    determining, with a processor of the HMD device, a location of the electromagnetic field sensor relative to the base station based on the sensed strength;
    determining, with the processor, a location of the electromagnetic field sensor in space based on the relative location, the predetermined offset, and the location of the location sensor in space;
    determining that a confidence level of the location of the electromagnetic field sensor in space determined using the magnetic tracking system is less than a predetermined threshold;
    determining a secondary location of the electromagnetic field sensor in space using the optical tracking system; and
    using an optical tracking system comprising at least one marker and at least one optical sensor configured to capture optical data, augmenting the magnetic tracking system based on the optical data and a location of the optical sensor or marker.

11. The method of claim 10, further comprising configuring the at least one optical sensor on the HMD device and the at least one marker on the object.

12. The method of claim 10, further comprising configuring the at least one optical sensor on the object and the at least one marker on the HMD device.

13. The method of claim 10, wherein the marker comprises a light source.

14. The method of claim 10, wherein the marker is reflective.

15. The method of claim 10, further comprising:
    determining a plurality of possible locations of the electromagnetic field sensor in space using the magnetic tracking system; and
    disambiguating between the possible locations using the optical tracking system.

16. The method of claim 10, wherein the object is a handheld input device configured to provide user input to the HMD device.

17. The method of claim 16, wherein the handheld input device comprises a housing including a grip area and the at least one marker or the at least one optical sensor is located on at least one protuberance that extends outside of the grip area.

18. A mixed reality system comprising:
    a head-mounted display (HMD) device comprising:
        a location sensor from which the HMD device determines a location of the location sensor in space;
        a base station mounted at a fixed position relative to the HMD device a non-zero predetermined offset from the location sensor and configured to emit an electromagnetic field;
        at least one optical sensor configured to capture optical data; and
        an at least partially see-through display configured to display augmented reality images;
    an electromagnetic field sensor affixed to an object and configured to sense a strength of the electromagnetic field, the base station and electromagnetic field sensor together forming a magnetic tracking system; and
    at least one marker on the object, the optical sensor and the marker together forming an optical tracking system; wherein
    the object includes a processor configured to determine a location of the electromagnetic field sensor relative to the base station based on the sensed strength;
    the HDM device includes a processor configured to:
        determine a location of the electromagnetic field sensor in space based on the relative location, the predetermined offset, and the location of the location sensor in space;
        determine that a confidence level of the location of the electromagnetic field sensor in space determined using the magnetic tracking system is less than a predetermined threshold; and
        determine a secondary location of the electromagnetic field sensor in space using the optical tracking system;
        augment the magnetic tracking system based on the optical data and a location of the optical sensor or marker; and
    the at least partially see-through display is configured to overlay a hologram that corresponds to the location of the electromagnetic field sensor in space over time.

* * * * *